US012742347B2

(12) United States Patent
Rodriguez et al.

(10) Patent No.: US 12,742,347 B2
(45) Date of Patent: Sep. 22, 2026

(54) ROTARY LATCH WITH SPRING GUIDE

(71) Applicant: Southco, Inc., Concordville, PA (US)

(72) Inventors: Ismael Rodriguez, West Chester, PA (US); Leslie Catherine Rabian, Wilmington, DE (US); David Gray Judah, Philadelphia, PA (US); Kevin A. McCloskey, West Chester, PA (US); Seojun Yang, Gyeonggi-do (KR)

(73) Assignee: Southco, Inc., Concordville, PA (US)

( * ) Notice: Subject to any disclaimer, the term of this patent is extended or adjusted under 35 U.S.C. 154(b) by 603 days.

(21) Appl. No.: 17/925,632

(22) PCT Filed: May 21, 2021

(86) PCT No.: PCT/US2021/033529
§ 371 (c)(1),
(2) Date: Nov. 16, 2022

(87) PCT Pub. No.: WO2021/237007
PCT Pub. Date: Nov. 25, 2021

(65) Prior Publication Data
US 2023/0175295 A1 Jun. 8, 2023

Related U.S. Application Data

(60) Provisional application No. 63/028,915, filed on May 22, 2020.

(51) Int. Cl.
*E05C 19/02* (2006.01)
*E05B 15/00* (2006.01)
(Continued)

(52) U.S. Cl.
CPC ........ *E05C 19/024* (2013.01); *E05B 15/0053* (2013.01); *E05B 15/0295* (2013.01);
(Continued)

(58) Field of Classification Search
CPC ...... E05C 19/024; E05C 9/02; E05B 15/0053; E05B 15/0295; E05B 2015/0437
See application file for complete search history.

(56) References Cited

U.S. PATENT DOCUMENTS 3,659,886 A * 5/1972 Andrews ............... E05C 19/024 292/78
3,713,681 A * 1/1973 Worley ................. E05C 19/024 292/341.17
(Continued)

FOREIGN PATENT DOCUMENTS

EP 0326252 A1 8/1989
FR 1013656 A 8/1952
(Continued)

OTHER PUBLICATIONS

International Search Report and Written Opinion for International Application No. PCT/US2021/033529, dated Sep. 24, 2021, 16 pages.
(Continued)

*Primary Examiner* — Christine M Mills
*Assistant Examiner* — Christopher F Callahan
(74) *Attorney, Agent, or Firm* — Buchanan Ingersoll & Rooney PC

(57) ABSTRACT

A latch assembly includes a frame and a pawl including a surface for receiving a striker and being movably coupled to the frame between an open and a closed position. In the closed position, the pawl is positioned to retain the striker to the latch assembly, and, in the open position, the pawl is not positioned to retain the striker to the latch assembly. A spring guide is connected to the pawl and the frame, wherein, in the closed position of the pawl, the spring guide is configured to bias the pawl such that the pawl remains in the closed position, and in the open position of the pawl, the spring guide is configured to bias the pawl such that the pawl
(Continued)

remains in the open position. One end of the spring guide is connected to the pawl, and the opposite end of the spring guide is unconstrained.

8 Claims, 28 Drawing Sheets

(51) Int. Cl.
*E05B 15/02* (2006.01)
*E05C 9/02* (2006.01)
*E05B 15/04* (2006.01)

(52) U.S. Cl.
CPC ........ *E05C 9/02* (2013.01); *E05B 2015/0437* (2013.01); *E05B 2015/0493* (2013.01)

(56) References Cited

U.S. PATENT DOCUMENTS

| | | | | | |
|---|---|---|---|---|---|
| 4,687,237 | A * | 8/1987 | Bisbing | E05C 19/02 | 292/78 |
| 6,109,667 | A * | 8/2000 | Collins | E05C 19/02 | 292/78 |
| 2011/0260475 | A1 | 10/2011 | Spurr et al. | | |

FOREIGN PATENT DOCUMENTS

| | | | | |
|---|---|---|---|---|
| GB | 315027 | | | 7/1929 |
| GB | 315027 | A | * | 7/1929 |
| GB | 0326252 | A1 | * | 8/1989 |
| GB | 2297578 | A | | 8/1996 |
| KR | 10-2009-0115808 | A | | 11/2009 |
| KR | 10-2018-0020861 | A | | 2/2018 |

OTHER PUBLICATIONS

"C3—Grabber Catch Latches", Southco, 2022, https://southco.com/en_us_int/latches/push-to-close-latches/pull-to-open/c3-grabber-catch-latches, downloaded from the internet Nov. 8, 2022, 6 pages.

"R4—Rotary Latches", Southco, 2022, https://southco.com/en_us_int/latches/rotary-latch-systems/rotary-latches/r4-rotary-latches, downloaded from the internet Nov. 8, 2022, 7 pages.

International Preliminary Report on Patentability and Written Opinion for International Application No. PCT/US2021/033529, issued Nov. 17, 2022, 12 pages.

Office Action (Notice to File a Response) issued Apr. 28, 2025, by the Korean Intellectual Property Office in corresponding Korean Patent Application No. 20-2022-7000065 and an English translation of the Office Action. (17 pages).

Extended European Search Report issued Sep. 1, 2025, by the European Patent Office in corresponding European Patent Application No. 25175437.0-1005. (10 pages).

* cited by examiner

ROTARY LATCH WITH SPRING GUIDE

CROSS-REFERENCE TO RELATED APPLICATIONS

This application is a U.S. National Phase Patent Application of PCT Patent Application No. PCT/US2021/033529, filed May 21, 2021, which claims priority to U.S. Provisional Patent Application No. 63/028,915, filed on May 22, 2020, titled "ROTARY LATCH WITH SPRING GUIDE", the entirety of each of which is incorporated by reference herein for all purposes.

FIELD OF THE INVENTION

The present invention relates to the field of mechanical latches.

BACKGROUND OF THE INVENTION

Latch assemblies are relied on in many applications for securing items such as panels, doors, and doorframes together. For example, containers, doors, cabinets, closets, drawers, compartments and the like may be secured with a latch. One type of latch assembly includes a rotary pawl or cam, which remains open until the pawl or cam impinges on a striker (or bolt). The relative displacement of the assembly with respect to the striker causes the rotary pawl to rotate and capture the striker. There exists a need for new rotary pawl assemblies having a design that is at least one of simpler, more compact, and cost-effective.

SUMMARY OF THE INVENTION

According to a first aspect of the present invention, a latch assembly comprises:

a frame;

a pawl including a surface for receiving a striker and being movably coupled to the frame between an open and a closed position, wherein, in the closed position, the pawl is positioned to retain the striker to the latch assembly, and, in the open position, the pawl is not positioned to retain the striker to the latch assembly; and a spring guide connected to the pawl and the frame, wherein, in the closed position of the pawl, the spring guide is configured to bias the pawl such that the pawl remains in the closed position, and in the open position of the pawl, the spring guide is configured to bias the pawl such that the pawl remains in the open position, wherein one end of the spring guide is connected to the pawl, and the opposite end of the spring guide is unconstrained.

According to another aspect of the present invention, a latch assembly comprises:

a frame;

a pawl including a surface for receiving a striker and being movably coupled to the frame between an open and a closed position, wherein, in the closed position, the pawl is positioned to retain the striker to the latch assembly, and, in the open position, the pawl is not positioned to retain the striker to the latch assembly; and a spring positioned against a perimeter surface of the pawl, wherein, in the closed position of the pawl, the spring is configured to bias the pawl such that the pawl remains in the closed position.

According to still another aspect of the present invention, a multi-point latching system for a door comprises:

an actuator in the form of a latch, lever or handle, the actuator being configured to be moved between a first position and a second position;

an elongated rail or rod that is connected to the actuator and configured to move in response to moving the actuator between the first and second positions;

a plurality of pawls that are configured to be mounted to the door, wherein the pawls are each connected to the rail such that movement of the rail causes the pawls to move between locked and unlocked positions;

a striker mounted to the rail; and a latch that is configured to be mounted to the door, the latch including (i) a frame, (ii) a pawl having a surface for receiving the striker and being movably coupled to the frame between an open and a closed position, wherein, in the closed position, the pawl is positioned to retain the striker to the latch, and, in the open position, the pawl is not positioned to retain the striker to the latch, and (iii) a spring connected to the pawl, wherein, in the closed position of the pawl, the spring is configured to bias the pawl such that the pawl remains in the closed position.

BRIEF DESCRIPTION OF THE DRAWINGS

The above and other aspects and features of the present invention will become more apparent to those of ordinary skill in the art by describing in detail exemplary embodiments thereof with reference to the attached drawings.

In FIG. 3A, the latch is shown in a locked and latched state. In FIG. 3B, the latch is shown in an unlocked and latched state. In FIG. 3C, the latch is shown in an unlocked and unlatched state. In FIG. 3D, the latch is shown in an unlocked and unlatched state, and the trigger is rotated to a position such that the latch is ready to receive the striker again.

In FIG. 3K, various details of the multipoint latching system are shown in phantom to indicate that those details are positioned on an opposing side of the door and would not normally be visible as viewed from that perspective.

In FIG. 4B, the latch is shown in a locked configuration. In FIG. 4C, the latch is shown in a latched configuration. In FIG. 4D, the latch is shown in an unlatched and unlocked configuration. In FIG. 4E, the latch is shown in an unlatched and locked configuration.

In FIG. 5E, the latch is shown in a locked and latched state. In FIG. 5F, the latch is shown in an unlocked and unlatched state, and the trigger is rotated to a position such that the latch is ready to receive the striker again.

DETAILED DESCRIPTION OF THE INVENTION

Figure 1A:
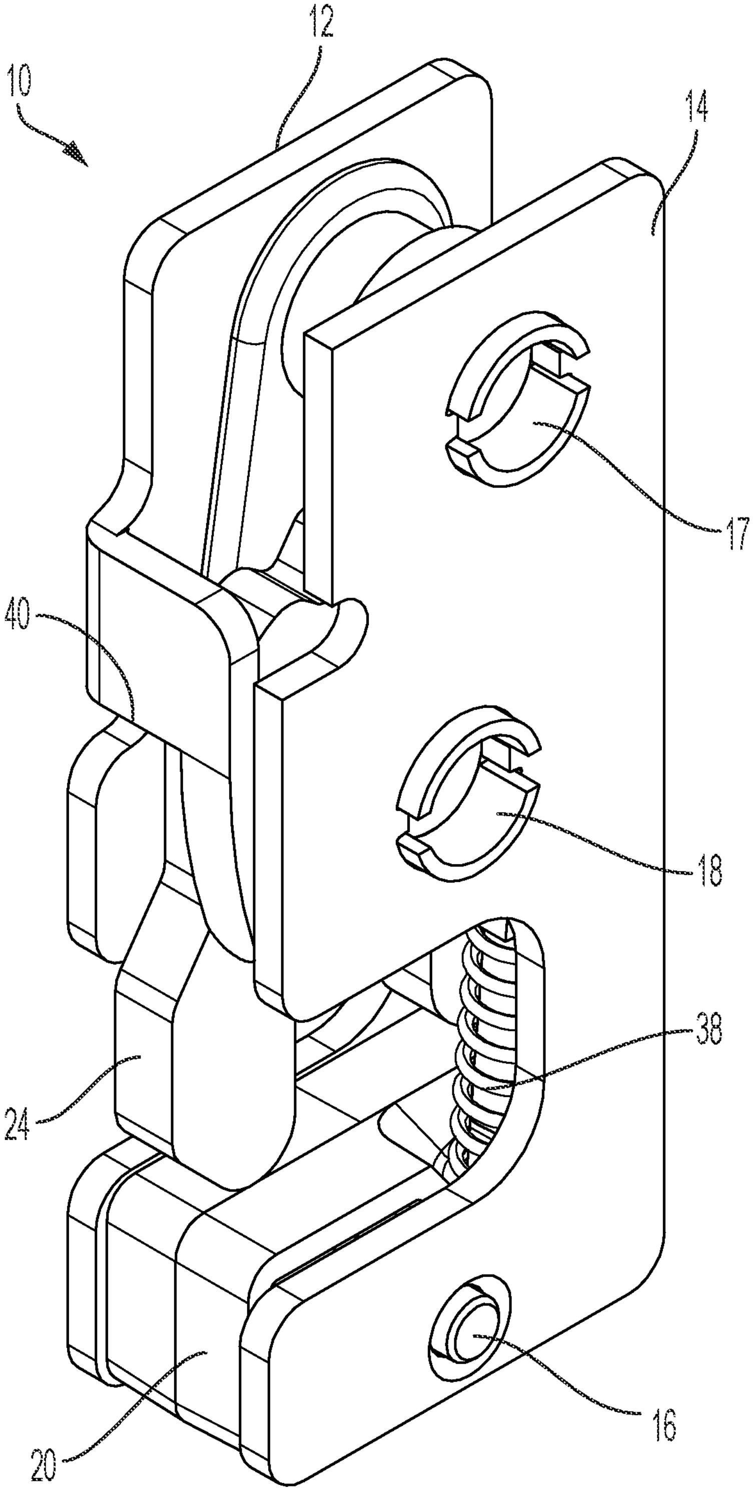
FIG. 1A depicts an isometric view of a latch according to a first exemplary embodiment of the invention.
Figure 1B:
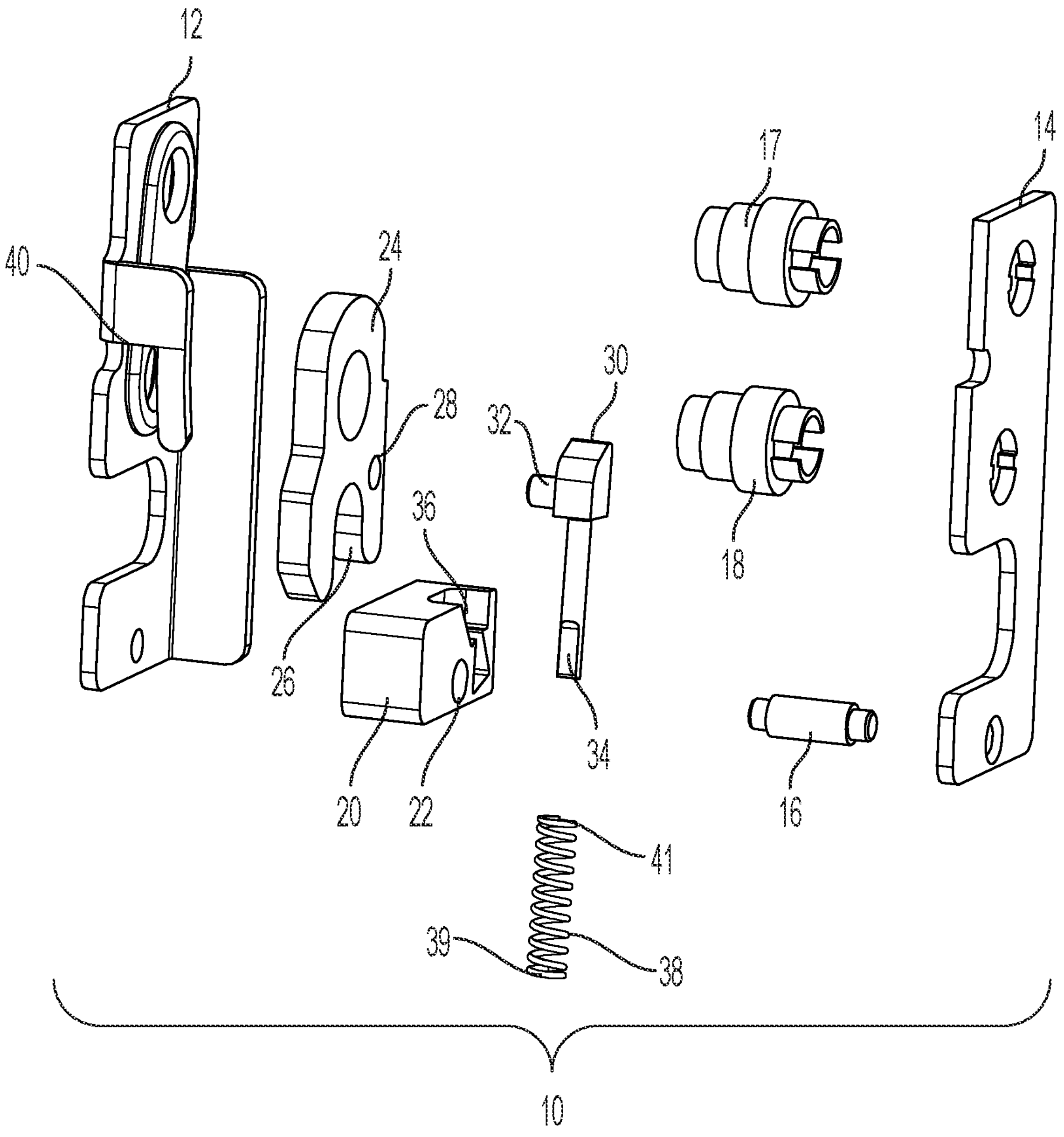
FIG. 1B depicts an exploded view of the latch of FIG. 1A.

Although the invention is illustrated and described herein with reference to specific embodiments, the invention is not intended to be limited to the details shown. Rather, various modifications may be made in the details within the scope and range of equivalents of the claims and without departing from the invention.

Various terms are used throughout the disclosure to describe the physical shape or arrangement of features. A number of these terms are used to describe features that conform to a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to a center axis. The terms "radial" and "radially" refer to a direction, dimension or orientation that is perpendicular to the center axis. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Terms concerning attachments, coupling and the like, such as "mounted," "connected" and "interconnected," refer to a relationship wherein structures are secured or attached to one another either directly or indirectly through intervening structures, as well as both movable or rigid attachments or relationships, unless expressly described otherwise.

The terms "proximal" and "distal" may be used herein as relative terms.

Figure 1C:
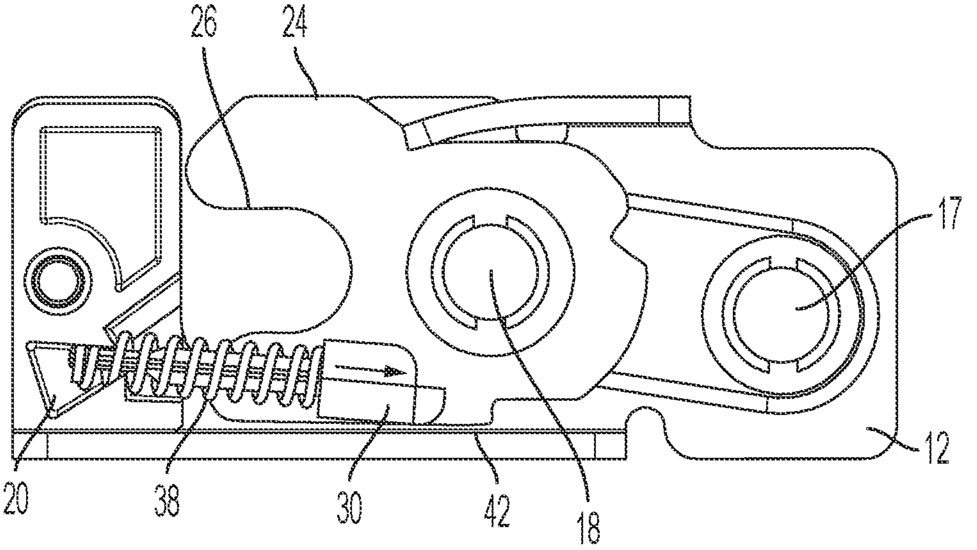
FIGS. 1C and 1D depict elevation views of the latch of FIG. 1A in closed and open positions, respectively, wherein a cover of the latch has been omitted to reveal the internal components of the latch.
Figure 1D:
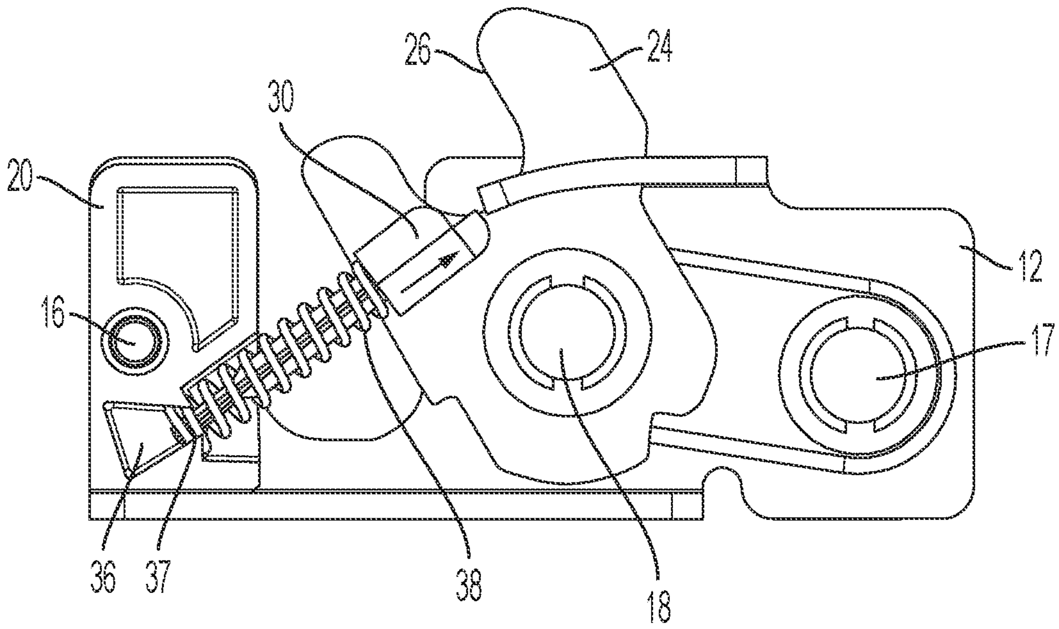

FIGS. 1A-1D depict a first exemplary embodiment of a latch 10. Latch 10 generally comprises a rear frame member 12 and a front frame member 14 that are connected together by pins 16, 17, 18. Taken together these components may be said to constitute a frame or housing. The frame members are (optionally) composed of bent sheetmetal, and may together be considered a housing for the latch 10. Although not shown, additional fasteners may be included for fastening the frame members 12 and 14 together. The frame members 12 and 14 are spaced apart from each other by the pins 16-18 to form an interior space for accommodating the other components of the latch 10. More particularly, a spring guide retention member 20 is positioned between the frame members 12 and 14, and includes an opening 22 for receiving the pin 16, as well as an opening 36 having a dovetail shape for receiving a spring guide 30 (as is described later). A pawl 24 is rotatably mounted to the pin 18, and moves (i.e., rotates) between a closed position (FIG. 1C) and an open position (FIG. 1D). The pawl 24 includes an open C-shaped channel 26 that is sized and configured to accommodate and interact with a striker, as is known in the art. An opening 28 is provided in the pawl 24 to which a spring guide 30 is rotatably connected. The spring guide 30 is an elongated body having a first end defining a pin 32 that is rotatably positioned within the opening 28 in the pawl 24. The second, opposite, end 34 of the spring guide 30 is substantially flat and is positioned to travel within an opening 36 defined in the member 20. The end 34 moves in an unconstrained fashion within the opening 36 of the member 20 and without becoming detached from the member 20 as the pawl 24 moves between the open and closed positions. A compression spring 38 is positioned over the elongated portion of the spring guide 30. One end 39 of the spring 38 is positioned to bear on a shoulder 37 of the opening 36 of the member 20, while the opposite end 41 of the spring 38 is positioned to bear on the pin 32 of the spring guide 30.

In the closed position of the pawl 24 shown in FIG. 1C, the spring 38 is configured to urge the pawl 24 in a counterclockwise position (as viewed in that figure) and to remain in the closed position. Conversely, in the open position of the pawl 24 shown in FIG. 1D, the spring 38 is configured to urge the pawl 24 in a clockwise position and to remain in the open position. Therefore, the latch 10 may be considered a bi-stable latch because the latch 10 can remain in the open position until it is moved to the closed position and can also remain in the closed position until it is moved to the open position. In other words, the latch 10 is stable in both the closed and open positions. The latch 10 is bi-stable at least in part because the pin 32 of the spring guide 30 is connected to the pawl 24 at a location whereupon, in the closed position of the pawl 24, a force vector (see arrow in FIG. 1C) of the spring guide 30 urges the pawl 24 about its rotational axis toward the closed position. And, in the open position of the pawl 24, a force vector (see arrow in FIG. 1D) of the spring guide 30 urges the pawl 24 about its rotational axis toward the open position.

To move the latch 10 from the closed position to the open position, the striker (not shown) is pulled away from the latch 10 (or vice versa) with sufficient force, thereby rotating the pawl 24 in the clockwise direction and against the bias of the spring 38. At some point during rotation from the closed position to the open position, the spring 38 is positioned such that it urges the pawl 24 toward the open position. The striker eventually separates from the channel 26 of the pawl 24, and the pawl 24 remains in the open position by virtue of the bias of the spring 38. In the open position, the top end of the pawl 24 comes to rest against a bearing surface 40 that is formed on a tab of the frame member 12.

To move the latch 10 from the open position to the closed position, the striker is moved into the channel 26 of the pawl 24, thereby rotating the pawl 24 in the counterclockwise direction and against the bias of the spring 38. At some point during rotation from the open position to the closed position, the spring 38 is positioned such that it urges the pawl 24 toward the closed position. Once the pawl 24 reaches the closed position, the striker is captivated within the channel 26 of the pawl 24, and the pawl 24 remains in the closed position by virtue of the bias of the spring 38. In the closed position, the bottom end of the pawl 24 comes to rest against a bearing surface 42 that is formed on a tab of the frame member 12.

The latch 10 may be referred to as a “pull to open” and “push to close” type latch.

FIGS. 2A-2D depict a second exemplary embodiment of a latch 110. The latch 110 is substantially similar to the latch 10 and only the primary differences between those latches will be described hereinafter. Latch 110 generally comprises a rear frame member 112 and a front frame member 114 that are connected together by pins 117 and 118 and/or other fasteners. An opening 136 is formed in the front frame member 114 for accommodating movement of a spring guide 130. The end 134 of the spring guide 130 is substantially flat and is positioned to travel within the opening 136. The end 134 has a cross-sectional area that is reduced as compared to a cross-sectional area of the elongated portion of the spring guide 130 that is located closer to the pin connector 132. The end 134 moves within the opening 136 without becoming detached from the opening 136 as the pawl 124 rotates about the pin 118 between the open and closed positions. A compression spring 138 is positioned over the elongated portion of the spring guide 130. One end 139 of the spring 138 is positioned to bear on the interior facing surface 137 of a tab formed on the frame member 114, while the opposite end 141 of the spring 138 is positioned to bear on a pin connector 132 of the spring guide 130. The pin connector 132 is rotatably coupled to an opening 133 formed in the pawl 124, like the first embodiment. A striker bumper 150, which may be composed of a soft ductile material, is positioned between the frame members 112 and 114. A concave top surface 152 of the bumper 150 is arranged to be contacted by the striker when the latch 110 is maintained in the closed position. In operation, the striker bumper 150 either prevents or limits bumps, squeaks and rattles.

Figure 2A:
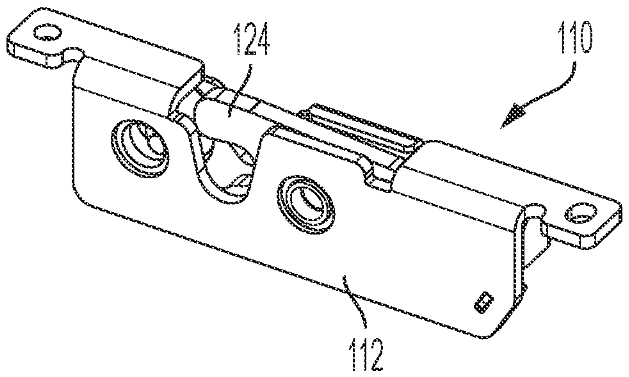
FIG. 2A depicts an isometric view of a latch according to a second exemplary embodiment of the invention.
Figure 2B:
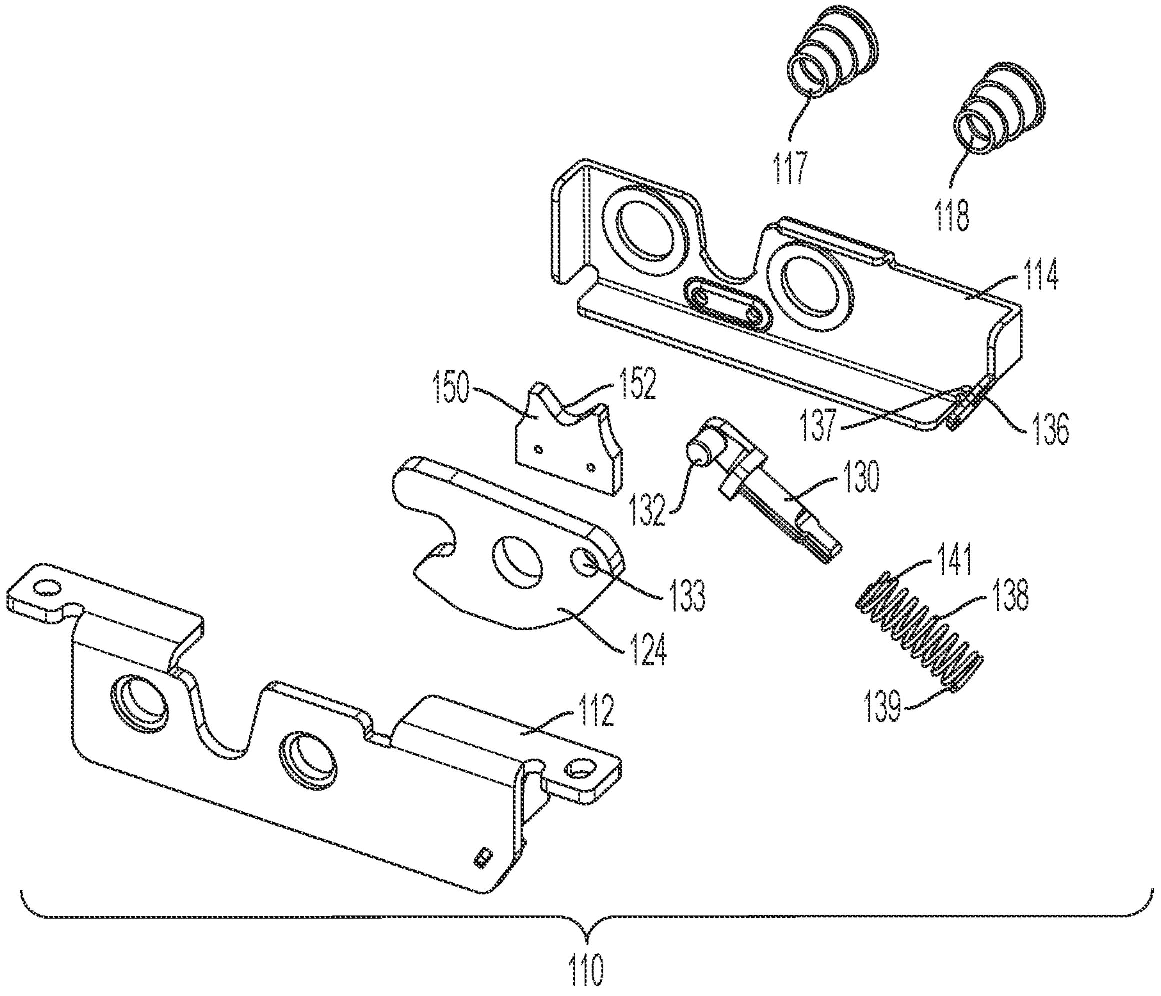
FIG. 2B depicts an exploded view of the latch of FIG. 2A.
Figure 2C:
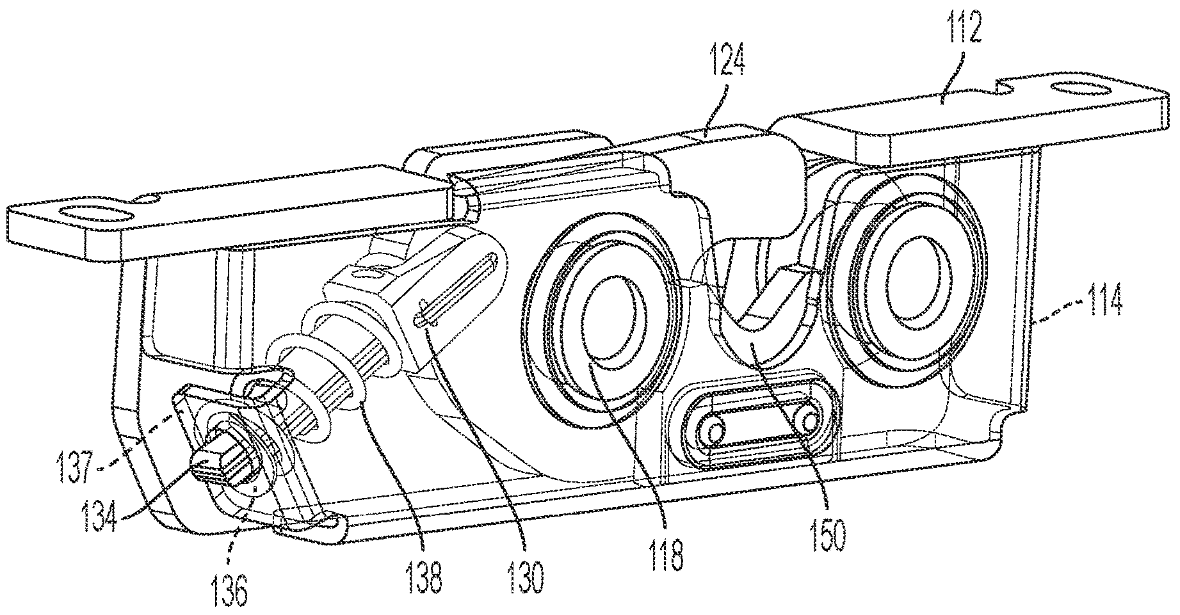
FIGS. 2C and 2D depict isometric views of the latch of FIG. 2A in closed and open positions, respectively, wherein a cover of the latch is shown in phantom lines to reveal the internal components of the latch.
Figure 2D:
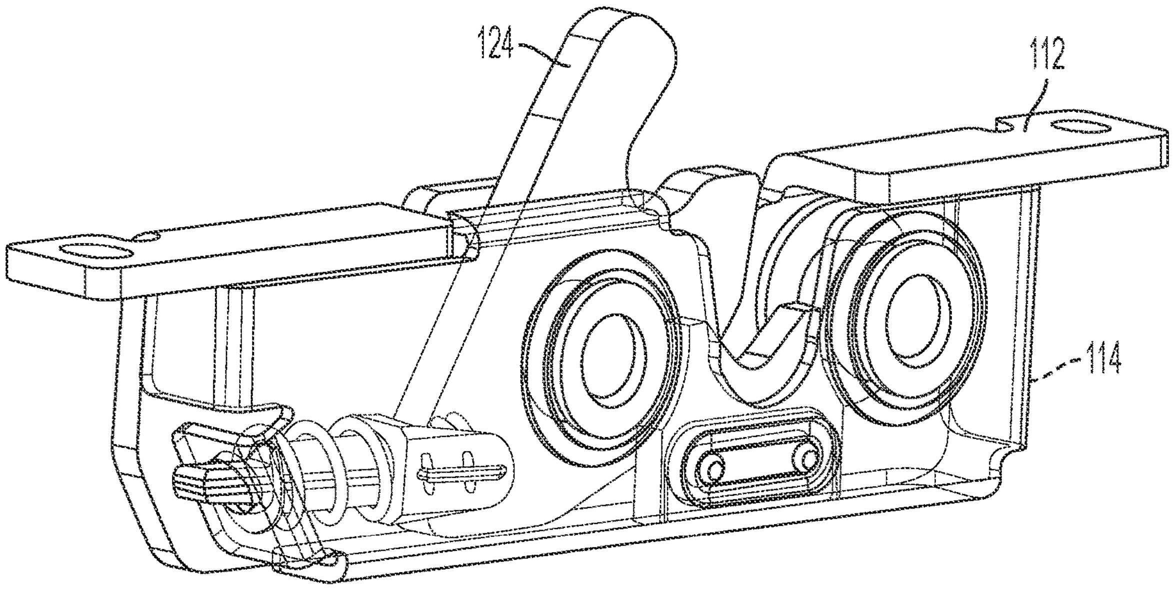

In the closed position of the pawl 124 shown in FIG. 2C, the spring 138 is configured to urge the pawl 124 in a clockwise direction (as viewed in that figure) and to remain in the closed position. Conversely, in the open position of the pawl 124 shown in FIG. 2D, the spring 138 is configured to urge the pawl 124 in a counterclockwise direction and to remain in the open position. Therefore, like the latch 10, the latch 110 may be considered a bi-stable latch because the latch 110 can remain in the open position until it is moved to the closed position and can also remain in the closed position until it is moved to the open position.

Although not shown, the latches 10 and 110 may also include a trigger, like trigger 211, that is configured to retain the pawl in a locked position as well as release the pawl.

FIG. 3A-3F depict a third exemplary embodiment of a latch 210. In FIGS. 3A-3D, the latch 210 is shown interacting with an actuator 202 and striker assembly 204. The actuator 202 may form part of a larger assembly including the latch 210. Similarly, the striker assembly 204 may form part of a larger assembly including the latch 210 and/or actuator 202.

The actuator 202 is (optionally) an electric solenoid that is configured to be connected to a power source and a computer controller by wires 203. Upon receiving a command from the computer controller (not shown), the actuator 202 is configured to actuate (i.e., extend or retract or otherwise translate) a piston 205 from the end of actuator 202, and the piston 205 is configured to interact with a trigger 211 of the latch 210, as will be described later. Other types of actuators are known to those skilled in the art. Also, the actuator 202 may be omitted.

The striker assembly 204 includes an elongated rail 208, and a striker 207 that is fixedly mounted to the rail 208 by a bracket 209 using fasteners. Rail 208 may be flat, as shown, or may be rounded, for example. The geometry and shape of rail 208 can vary. The rail 208 is movable with respect to the latch 210 in the direction of the arrows shown in FIG. 3C. Either the rail 208 moves with respect to latch 210, or the latch 210 moves with respect to the rail 208. The striker 207 is a cylindrical (or semi-cylindrical) member that is configured to interact with the pawl 224 of the latch 210.

The latch 210 shares some similarities with the latch 110 and the primary differences between those latches will be described hereinafter. Referring now to FIGS. 3E and 3F, latch 210 generally comprises a rear frame member 212 and a front frame member 214 that are connected together by pins 217 and 218 and/or other fasteners. The rear frame member 212 includes a mounting surface and opening 213 to which the actuator 202 (not shown in FIGS. 3E and 3F) is mounted by fasteners (not shown). A pawl 224 has an opening through which the pin 218 is positioned, and the pawl 224 moves (i.e., rotates) about the pin 218 between a closed position (FIG. 3B) and an open position (FIG. 3C). A torsion spring 215 is mounted around the pin 218 and includes a first free end that is mounted on the rear frame member 212 (or other stationary feature) and a second free end that is mounted to a bearing surface on the pawl 224. The spring 215 biases pawl 224 to the open position. A trigger 211 has an opening through which the pin 217 is positioned, and the trigger 211 moves (i.e., rotates) between a locked position (FIG. 3F) and an unlocked position (FIG. 3C). A torsion spring 219 is mounted around the pin 217 and includes a first free end that is mounted on the rear frame member 212 (or other stationary feature) and a second free end that is mounted to a bearing surface on the trigger 211. The spring 219 biases trigger 211 to the unlocked position.

A spring member 230, which is formed from a ductile and resilient material, is positioned at an elevation that is both above the frame member 212 and beneath the trigger 211 and pawl 224. The spring member 230 includes four legs depending therefrom that urge the trigger 211 and the pawl 224 toward the frame member 214, thereby preventing the trigger 211 and pawl 224 from rattling during operation. A spring arm 232 also extends from the spring member 230. The spring arm 232 is a flexible curved member that is positioned to interact with a perimeter surface of the pawl 224.

Specifically, as shown in FIG. 3F, in the closed position of the pawl 224, the spring arm 232 is seated in a concave recess, indent or depression 234 formed on the outer perimeter of the lower side of the pawl 224. The holding force exerted by the spring arm 232 onto the pawl 224 is greater than the force exerted by the torsion spring 215 such that the pawl 224 remains in the closed position even after the trigger 211 has been moved to the unlocked position (FIG. 3B). And, in the open position of the pawl 224, the spring arm 232 is seated in another concave recess, indent or depression 235 formed on the outer perimeter of the lower side of the pawl 224. It is noted that a plurality of depressions 234/235 are defined on the lower perimeter side of the pawl 224. Once the pawl 224 is moved to the open position, the force exerted by the spring arm 232 onto the pawl 224 retains the pawl in the open position.

Therefore, like the latch 10, the latch 210 also may be considered a bi-stable latch because the latch 210 can remain in the open position until it is moved to the closed position and can also remain in the closed position until it is moved to the open position.

In the locked position of the trigger 211 shown in FIG. 3F, a tab 221 extending from the perimeter of the trigger 211 bears on a bearing surface of the frame member 212. Also, in the locked position, a v-shaped recess 223 formed along the perimeter of the trigger 211 is positioned within a correspondingly v-shaped projection 225 formed on the perimeter of the pawl 224. Engagement between the recess 223 and projection 225 as well as the tab 221 and frame 212 prevents the pawl 224 from moving in a counterclockwise direction (as viewed in FIG. 3F) toward the open position.

The trigger 211 includes a control surface 227, in the form of a bent projection, that protrudes from the latch 210 toward the actuator 202. The control surface 227 is positioned to interact with the piston 205 of the actuator 202. The piston 205 is configured to bear on the bearing surface 227 to move the trigger 211 from the locked position (FIG. 3F) to the unlocked position (FIG. 3C).

Figure 3A:
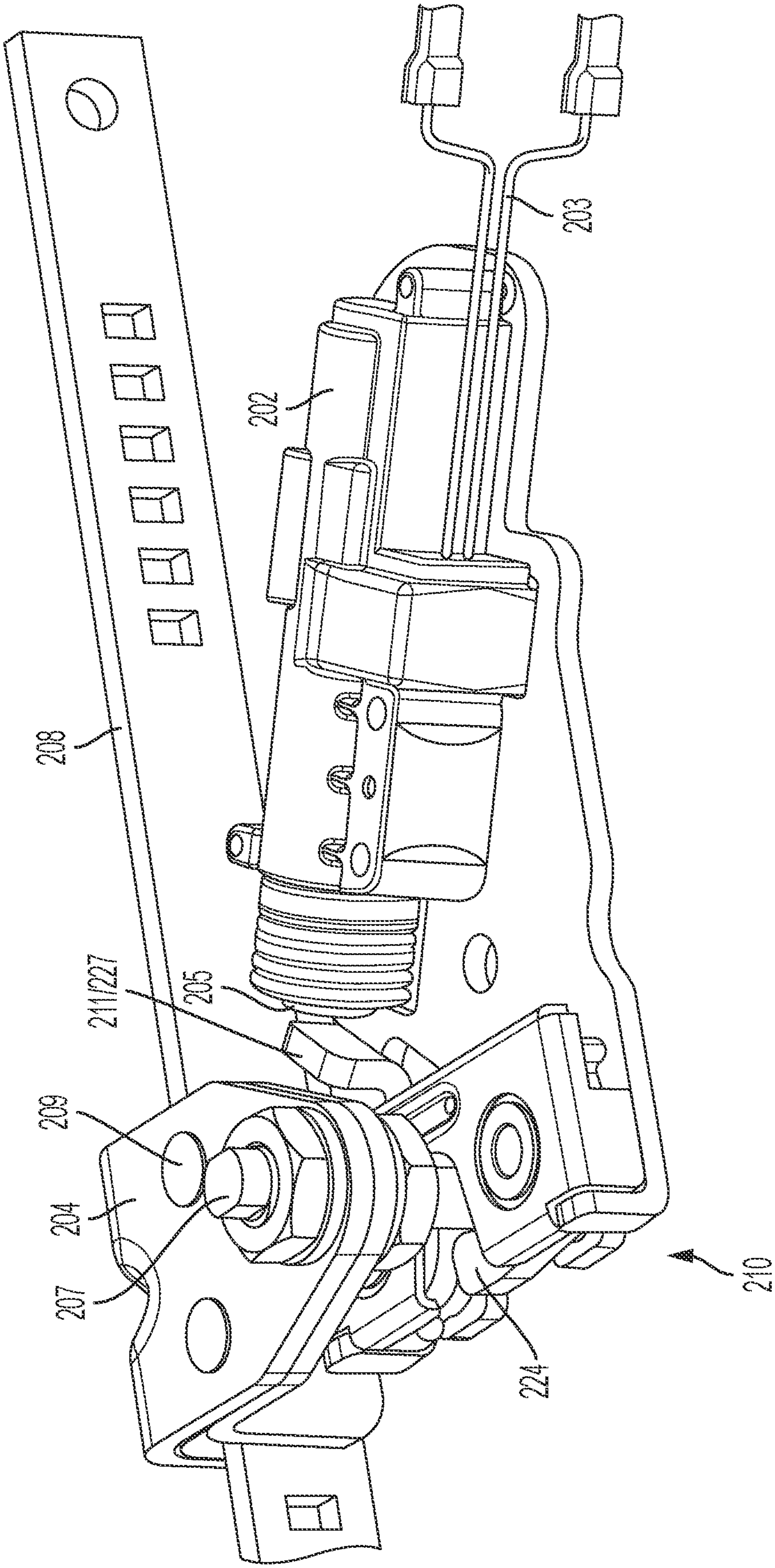
FIGS. 3A, 3B, 3C and 3D depict an isometric view of a latch according to a third exemplary embodiment of the invention that interacts with an actuator and striker.
Figure 3B:
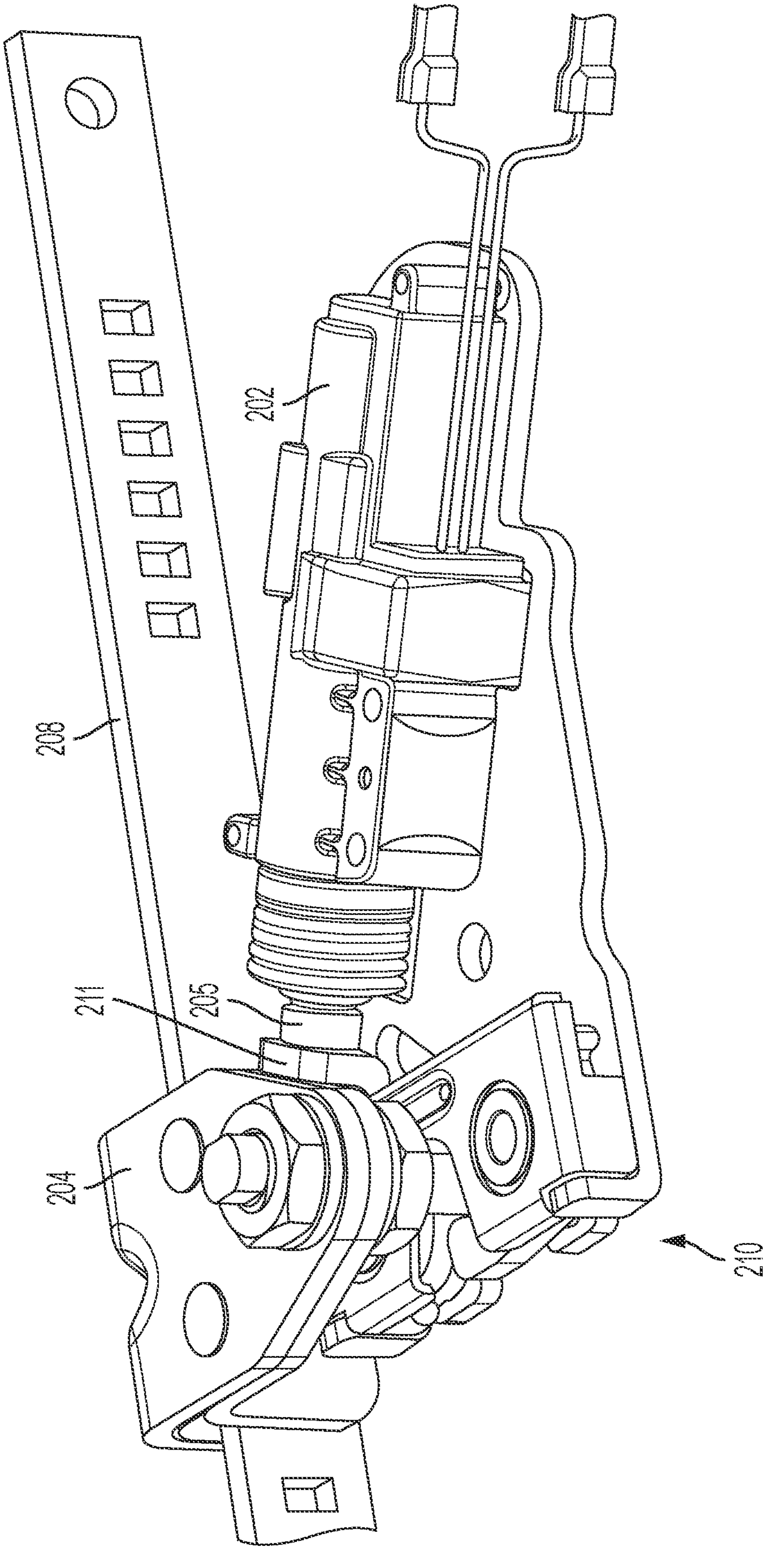
Figure 3C:
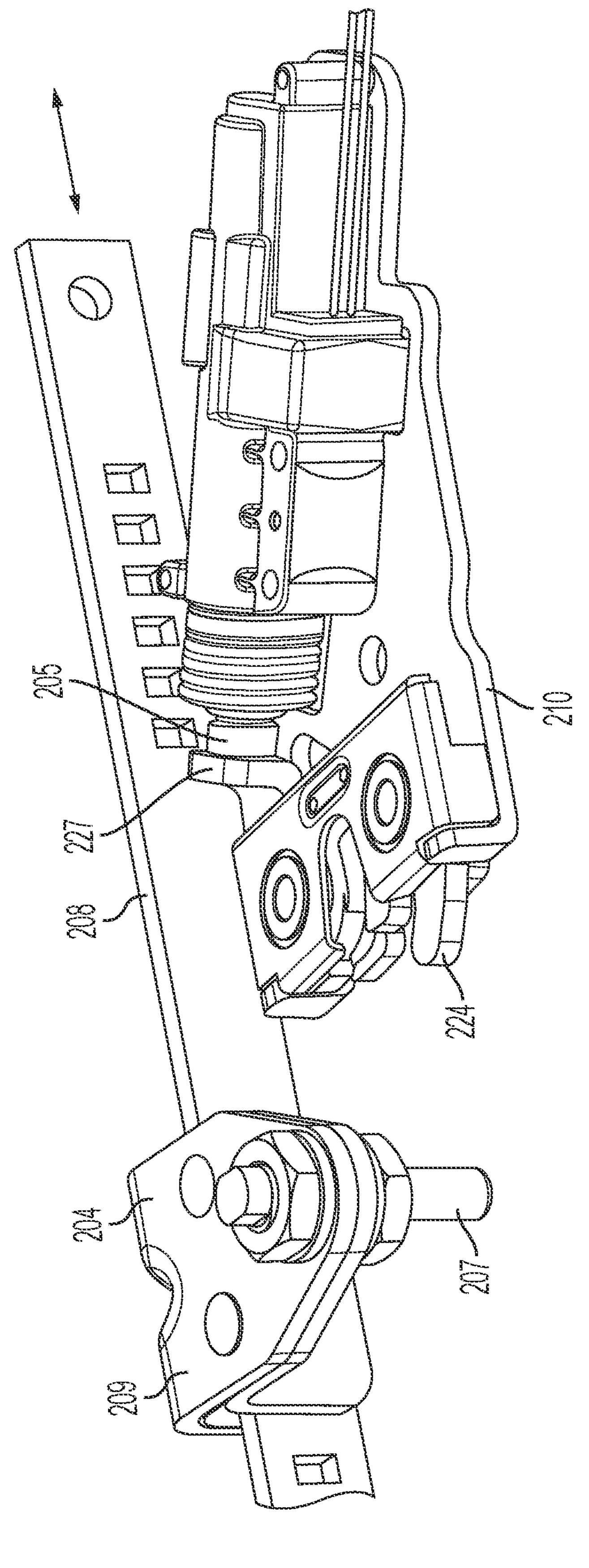
Figure 3D:
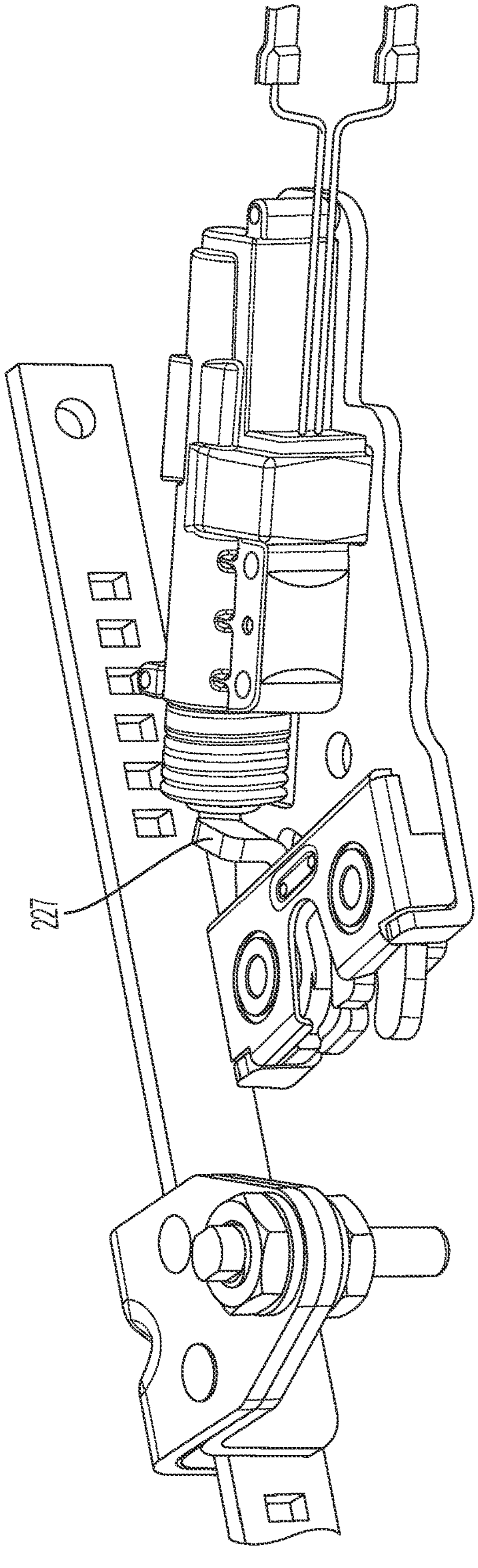
Figure 3E:
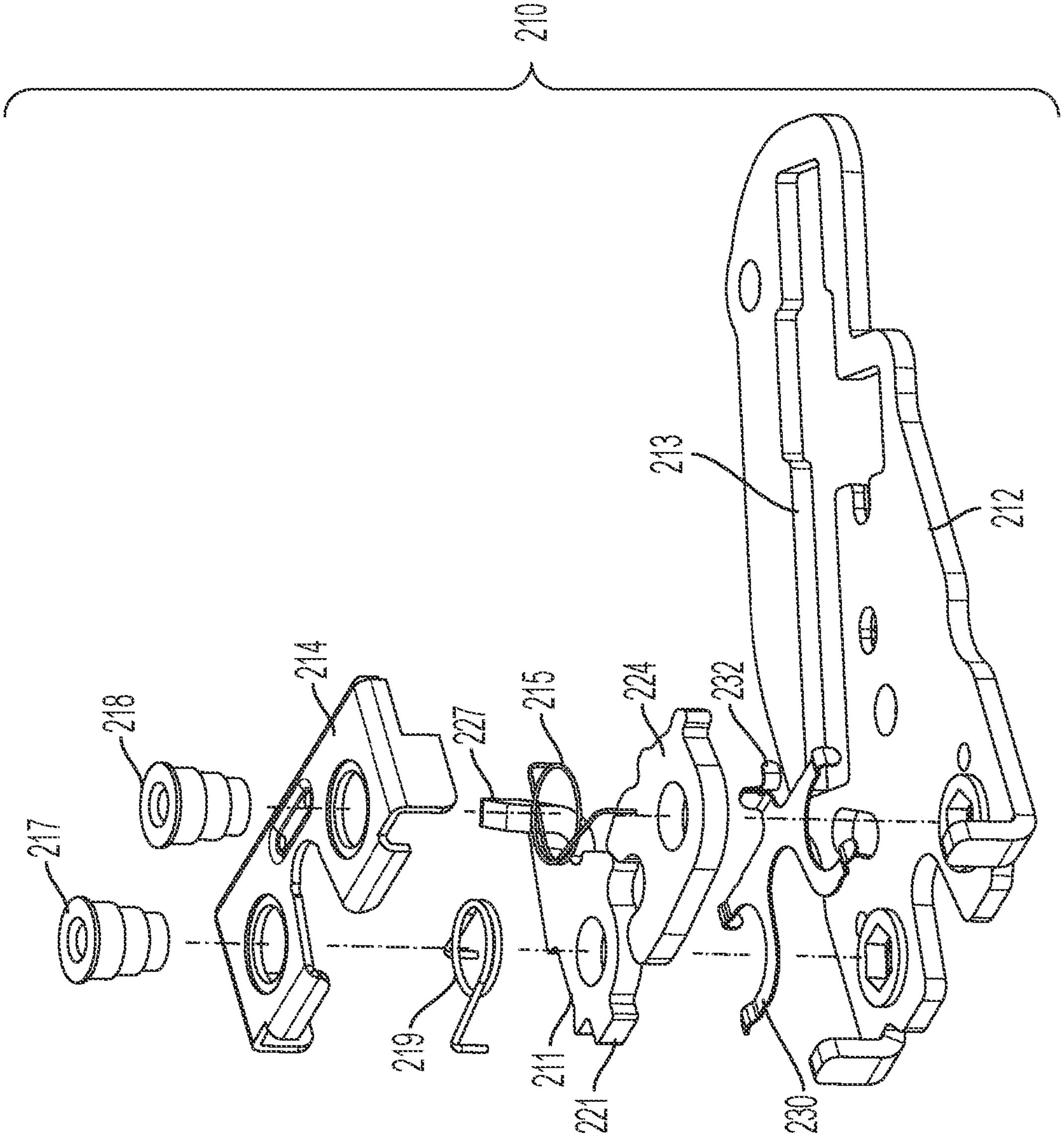
FIG. 3E depicts an exploded view of the latch of FIG. 3A, wherein the actuator and the striker have been omitted.
Figure 3F:
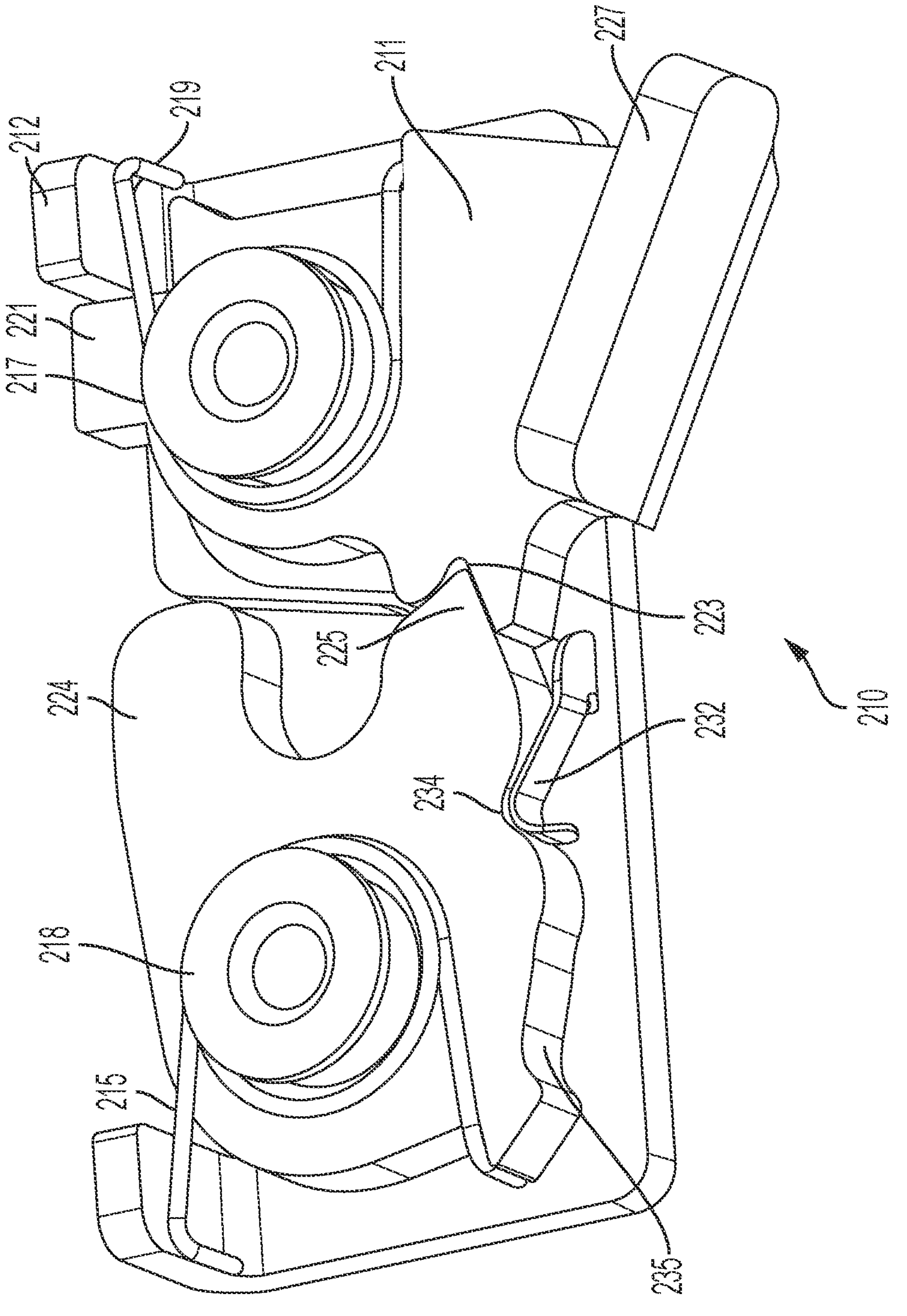
FIG. 3F depicts an isometric view of the latch of FIG. 3A in a closed and locked state, wherein various components have been omitted to reveal the internal components of the latch.
Figure 3G:
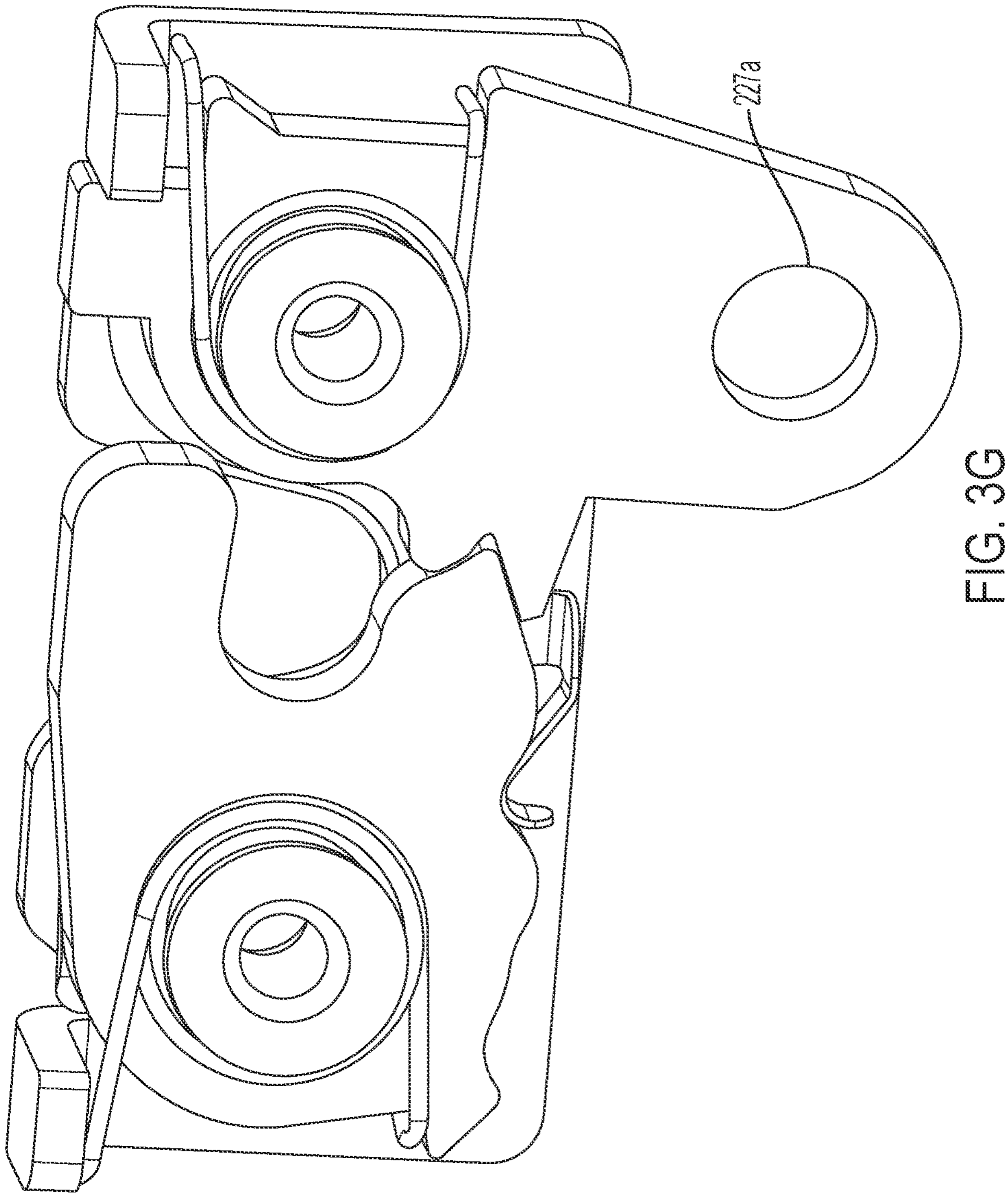
FIG. 3G depicts a first alternative design for the latch of FIG. 3F, wherein the latch includes an alternative trigger.
Figure 3H:
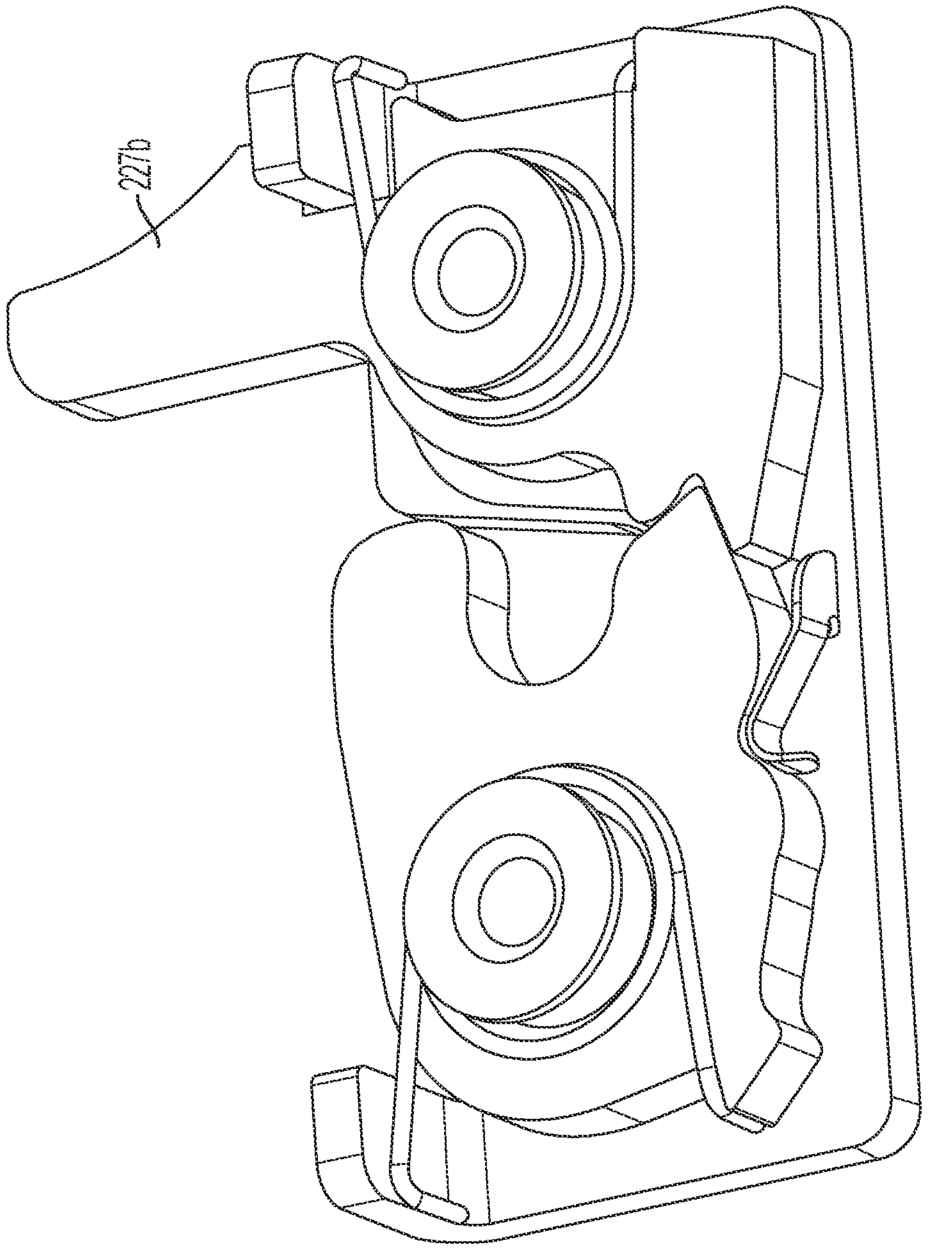
FIG. 3H depicts a second alternative design for the latch of FIG. 3F, wherein the latch includes a different alternative trigger.
Figure 3I:
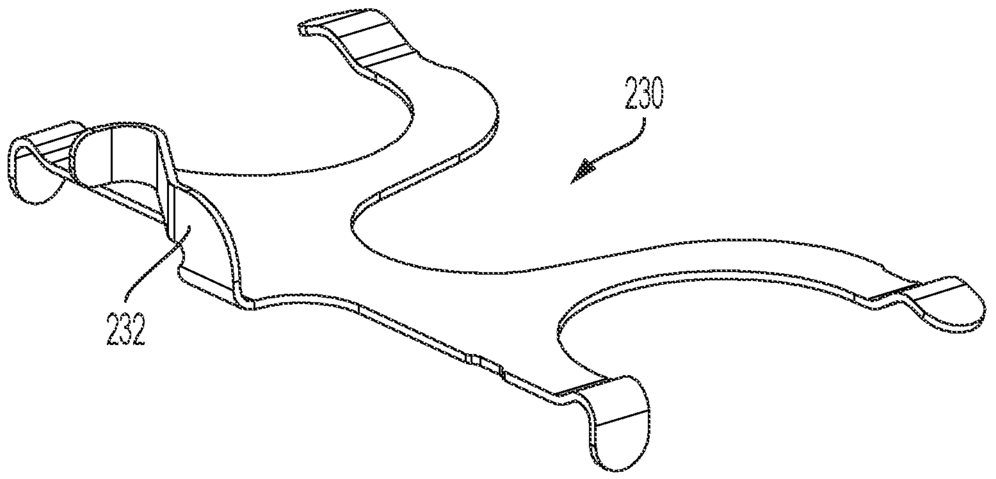
FIG. 3I depicts an isometric view of the spring of the latch of FIG. 3A.

As shown in FIGS. 3G and 3H, other control surfaces are envisioned. For example, in FIG. 3G, the control surface 227*a* has a hole or opening that may be connected to a cable (not shown), and the cable may be connected to an actuator (not shown) for pulling the cable to cause the trigger 211 to move from the locked position to the unlocked position. In FIG. 3H, the control surface 227*b* is provided in the form of a finger tab that is positioned on the top side of the trigger and is positioned to be accessed by (for example) a user for manually moving the trigger 211 to cause the trigger 211 to move from the locked position to the unlocked position.

Turning now to FIGS. 3A-3D, in FIG. 3A, the latch 210 is shown in a locked and latched state. In the locked and latched (i.e., closed) state, the latch 210 retains the striker 207 within the pawl 224. If a user were attempt to move the striker 207 away from the latch 210 (e.g., by translating the rail 208), the latch 210 would prevent the movement of the striker 207 and rail 208 because the trigger 211 would prevent the pawl 224 from rotating in a counterclockwise direction (as viewed in FIG. 3F) to the open position.

In FIG. 3B, the latch 210 is shown in an unlocked and latched state. To unlock the latch 210, the computer controller actuates the actuator 202, which causes the piston 205 of the actuator 202 to extend and bear on the control surface 227 of the trigger 211, which causes the trigger 211 to rotate in a counterclockwise direction (as viewed in FIG. 3F) and against the bias of the spring 219. Once the recess 223 of the trigger separates from the projection 225 of the pawl 224, the trigger 211 is maintained in the unlocked position, and the latch 210 is unlocked. In the unlocked state of the latch 210, the pawl 224 remains in the closed state by virtue of the engagement between the spring arm 232 and the pawl 224.

In FIG. 3C, the latch 210 is shown in an unlocked and unlatched state. To move the latch 210 from the latched (i.e., closed) state to the unlatched (i.e., open) state, the user translates the rail 208 and striker 207 away from the latch 210. The striker 207 moves the pawl 224 (which is unlocked) in the counterclockwise direction (as viewed in FIG. 3F) against the bias of the spring arm 232. As the pawl 224 rotates, the spring arm 232 slides along the lower surface of the pawl 224. The pawl 224 eventually releases the striker 207 as the striker 207 is moved away from the latch 210. The pawl 224 remains in the open state by virtue of the engagement between the spring arm 232 and the detent 235 of the pawl 224. At this stage, the trigger 211 remains in the unlocked state due to the engagement between the piston 205 and the control surface 227 of the trigger 211.

In FIG. 3D, the latch 210 is shown in an unlocked and unlatched state. To return the trigger 211 to the locked position, the computer controller actuates the actuator 202, which causes the piston 205 of the actuator 202 to retract and separate from the control surface 227 of the trigger 211. The torsion spring 219 returns the trigger 211 to its locked position whereupon the tab 221 bears on the frame member 212, as shown in FIG. 3F. At this stage, the pawl 224 remains open.

To return the latch 210 to the locked and latched state of FIG. 3A, the user moves the striker 207 toward the latch 210. The striker 207 engages the opening in the pawl 224, and the pawl 224 rotates in a clockwise direction (as viewed in FIG. 3F) against the bias of the spring 215. The projection 225 of the pawl 224 rides on the perimeter of the trigger 211 (and causes slight rotation of the trigger 211 against the bias of the spring 219) until the striker 207 bears on the frame members 212 and 214. And, at which time the projection 225 of the pawl 224 becomes seated in the recess 223 of the trigger 211. The latch 210 is then maintained in the locked and latched state of FIG. 3A.

Figure 3J:
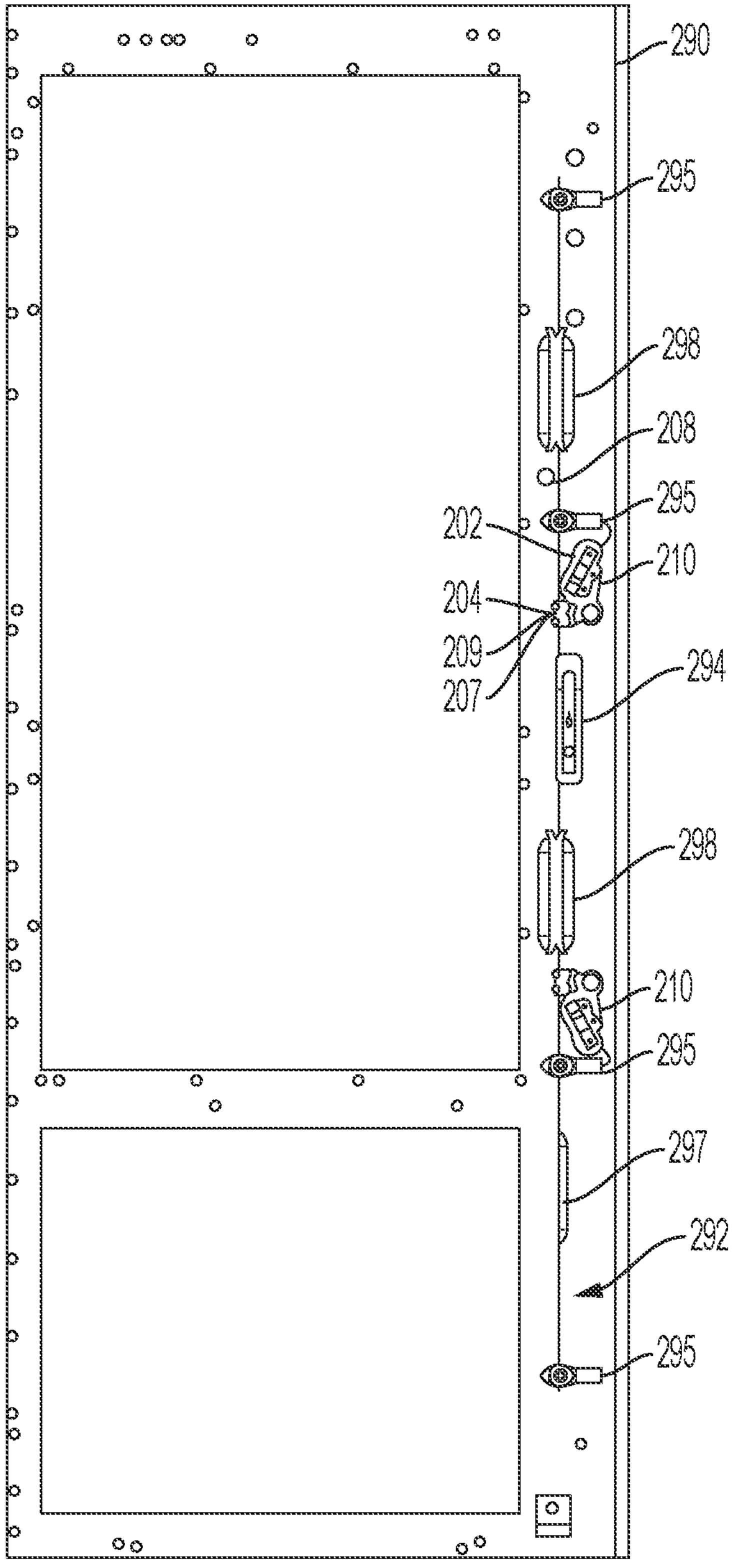
FIGS. 3J and 3K are isometric views of a multipoint latching system including the latch of FIG. 3A.
Figure 3K:
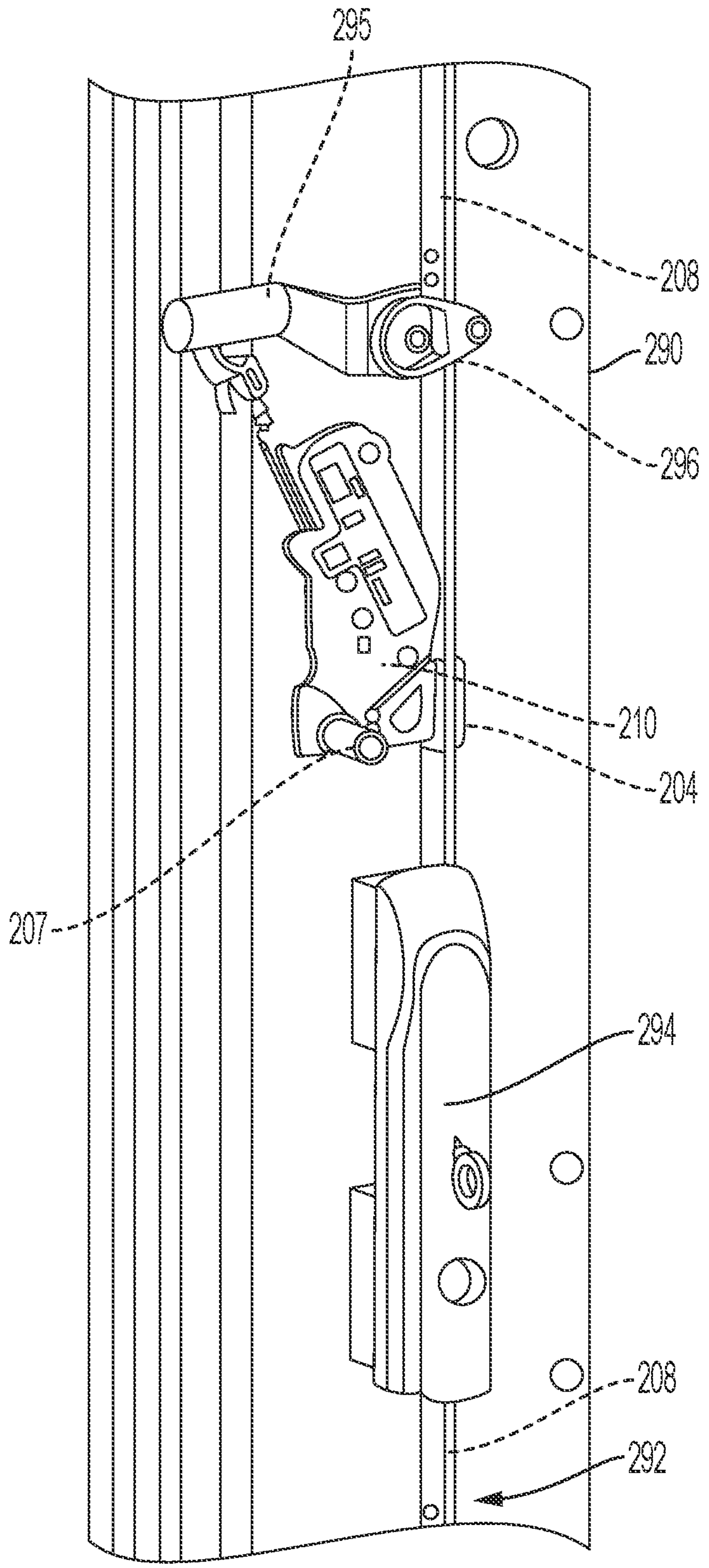

Turning now to FIGS. 3J and 3K, the latch 210, actuator 202 and rail 208 may be employed as part of a multi-point latching system 292 for securing a door 290 to a door frame or other structure.

The multi-point latching system 292 comprises an actuator 294 in the form of a lever, handle or driver, for example. The actuator 294 is movable between a first position that corresponds to a locked state of the door 290, and a second position that corresponds to an unlocked state of the door 290, as is known in the art. The actuator 294 has an output end that is connected to the rail 208 of FIG. 3C. Moving the actuator 294 between the first and second positions causes the rail 208 to translate up and down, as is known in the art.

One or more of the striker assemblies 204 are connected to the rail 208.

One or more pawls 295 (four shown) are individually connected to the door 290. The pawls 295 may be pivotably mounted to the door 290, for example. Specifically, each pawl 295 is connected to a cam 296 that pivots on the door 290. Each pawl 295 is also connected to the rail 208, such that translation of the rail 208 causes the cams 296 and the pawls 295 that are connected thereto to pivot between locked and unlocked positions. In the locked position, the pawls 295 are oriented such that they retain the door 290 to the door frame or other structure. And, in the unlocked position, the pawls 295 are oriented such that they do not retain the door 290 to the door frame or other structure.

One or more guides 297 are mounted to the door 290. Each guide 297 may include a rectangular through-hole for receiving the rail 208, in order to constrain the rail 208 in two translation degrees of freedom. One or more additional guides 298 are also mounted to the door 290. Each guide 298 may include an open ended slot for receiving the rail 208, in order to constrain the rail 208 in one translation degree of freedom.

One or more of the latches 210 are fixedly connected to the door 290. Each latch 210 is configured to interact with a striker 207 that is mounted to the rail 208, as was described previously. In the locked state of the latch 210, the latch 210 restrains the striker 207, as well as the entire multi-point latch system 292, from moving. In the unlocked state of the latch 210, the latch 210 does not prevent the striker 207, as well as the entire multi-point latch system 292, from moving.

Incorporating the latch 210 and striker 207 within the mechanical multi-point system 292, even as a retrofit, yields an electrically locking system 292. Accordingly, it is not necessary to substitute the mechanical actuator 294 with an electro-mechanical actuator. Also the push to close/pull to open style of the latch 210 allows the system 292 to remain closed even though the latch 210 is not locked. However, a remote signal can be transmitted to the latch 210 in order to lock the system 292. More particularly, the spring arm 232 holds pawl 234 in a fixed position until the striker 207 is moved, thereby allowing electronic locking if the door 290 is not open.

Although the multi-point latching system 292 has been described for use with the latch 210, it should be understood that the multi-point latching system 292 may incorporate any of the latches described herein without extensive modification.

FIG. 4A-4D depict a fourth exemplary embodiment of a latch 310. The latch 310 is similar to the latch 210 of FIG. 3A, and the primary differences therebetween will be described hereinafter.

The latch 310 generally comprises a frame or housing comprising a rear frame member 312 and a front frame member 314 that are connected together by fasteners or clips, for example. Various components are positioned within the interior space defined by the frame, and those components will be described hereinafter.

A pawl 324 includes co-aligned pins 318 that are positioned within openings 313 defined in the frame members. The pins 318 may be integral with the body of the pawl 324, or may comprise one or more separate components that are mounted to the pawl 324. The pawl 324 moves (i.e., rotates) about the openings 313 between a closed position (FIG. 4B) and an open position (FIG. 4D). The pawl 324 includes a concave area for receiving a striker, like the other pawls described above. A concave recess 325 (FIG. 4C) is formed along the perimeter of the pawl 324, and a corresponding projection 323 is formed on the perimeter of the trigger 311. Engagement between the recess 325 and projection 323 prevents the pawl 324 from rotating in a counterclockwise direction (as viewed in FIG. 4B) toward the open position.

An opening 328 (FIG. 4A) is provided in the pawl 324 to which a spring guide 330 is rotatably connected. The spring guide 330 is an elongated body having a first bifurcated connection end 331 that is rotatably positioned within the opening 328 in the pawl 324 by a pin 332 that is positioned through co-aligned holes in the bifurcated end 331. The second, opposite, end 334 of the spring guide 330 is substantially flat and is positioned to travel within an opening 336 defined in the frame. The end 334 moves in an unconstrained fashion within the opening 336 of the frame and without becoming detached from the frame as the pawl 324 moves between the open and closed positions. A compression spring 338 is positioned over the elongated portion of the spring guide 330. One end of the spring 338 is positioned to bear on a shoulder 337 (FIG. 4D) of the opening 336 of the frame, while the opposite end of the spring 338 is positioned to bear on the bifurcated connection end 331 of the spring guide 330.

Figure 4A:
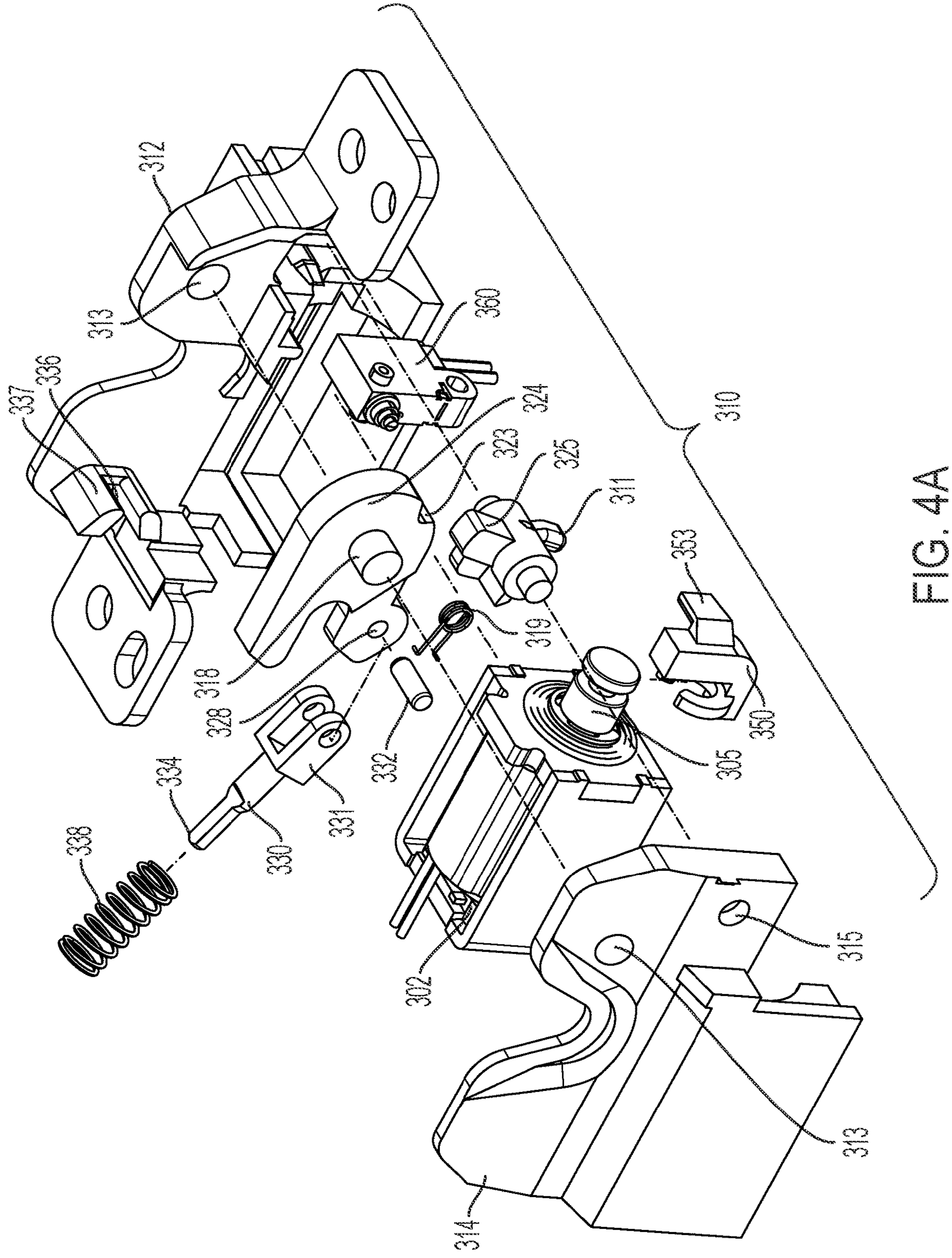
FIG. 4A depicts an exploded view of a latch according to a fourth exemplary embodiment of the invention.
Figure 4B:
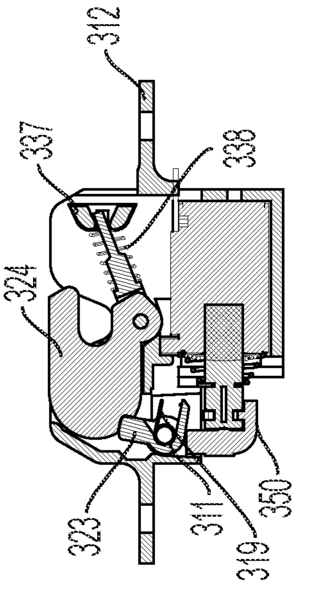
FIGS. 4B-4E depict cross-sectional views of the latch of FIG. 4A.

In the closed position of the pawl 324 shown in FIG. 4B, the spring 338 is configured to urge the pawl 324 in a counterclockwise position (as viewed in that figure) and to remain in the closed position. Conversely, in the open position of the pawl 324 shown in FIG. 4D, the spring 338 is configured to urge the pawl 324 in a clockwise position and to remain in the open position. Therefore, the latch 310 may also be considered a bi-stable latch because the latch 310 can remain in the open position until it is moved to the closed position and can also remain in the closed position until it is moved to the open position.

Figure 4C:
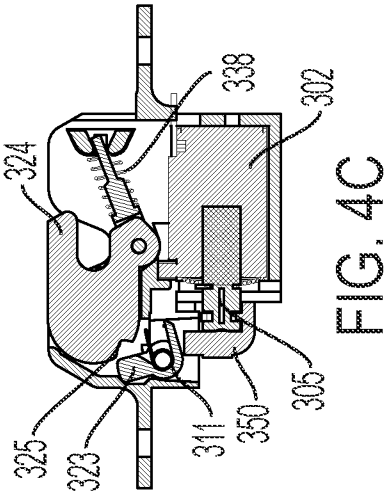
Figure 4D:
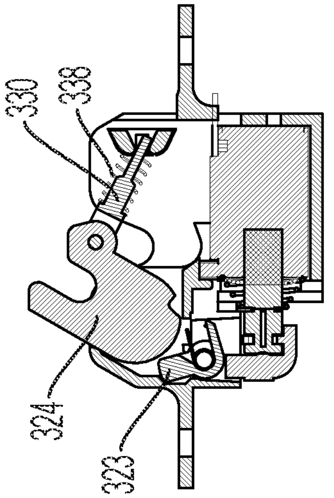
Figure 4E:
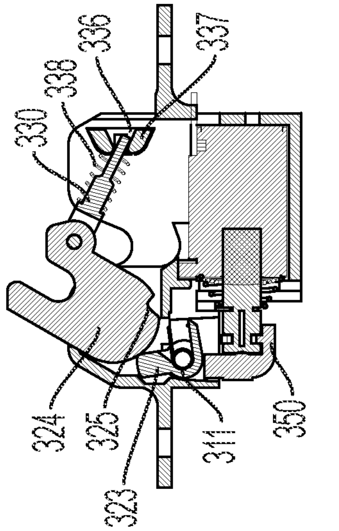
Figure 4G:
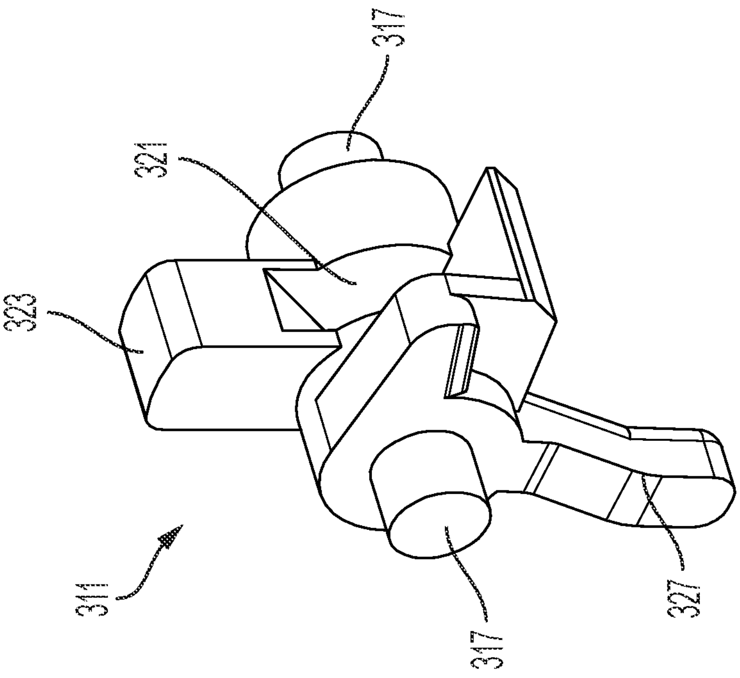
FIG. 4G depicts an isometric view of the trigger of the latch of FIG. 4A.

As best shown in FIG. 4G, the trigger 311 includes co-aligned pins 317 that are positioned within openings 315 (FIG. 4A, one shown) defined in the frame members. The pins 317 may be integral with the body of the trigger 311, or may comprise one or more separate components that are mounted to the trigger 311. In use, the trigger 311 moves (i.e., rotates) about the opening 315 (FIG. 4A, one shown) between a locked position (FIG. 4B) and an unlocked position (FIG. 4C). The axes of rotation of the trigger 311 and the pawl 324 are parallel. The trigger 311 includes a control surface 327 in the form of a leg that extends from the body of the trigger 311. The control surface 327 is configured to be contacted by an actuator 302, as will be described later, for moving the trigger 311 between the locked and unlocked positions. An opening 321 is defined in the body of the trigger 311 for accommodating the coiled portion of a torsion spring 319. A pin (such as pin 317) may be positioned through the coiled portion of the spring 319 to retain the spring 319 in place. One leg of the torsion spring 319 is positioned against the trigger 311 while the other leg of the torsion spring 319 is positioned against a stationary surface, such as a surface on the frame. The spring 319 biases trigger 311 to the locked position.

An actuator 302 is mounted to the frame and is configured to actuate (i.e., extend or retract or otherwise translate) a piston 305 from the end of actuator 302. The actuator 302 is a solenoid, however, other types of actuators are known to those skilled in the art. Like the above described actuators, the actuator 302 is connected to the computer controller for control purposes.

Figure 4F:
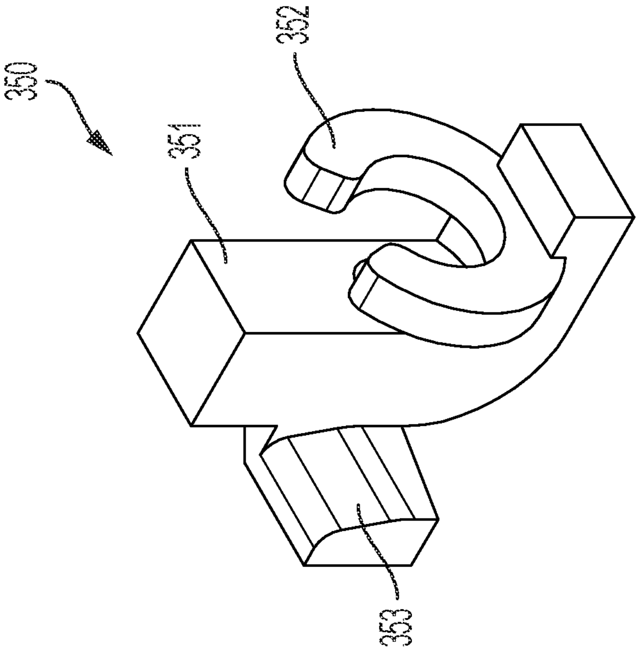
FIG. 4F depicts an isometric view of the cap of the latch of FIG. 4A.

As best shown in FIGS. 4C and 4F, a cap 350 is connected to the piston 305 in a fixed manner such that the cap 350 moves with the piston 305. The cap 350 has a J-shaped body

351, a C-clip 352 mounted to the curved end of the body 351, and a projection 353 that extends longitudinally and outwardly from the body 351. C-clip 352 and projection 353 may be integrated with the body 351, or those features may be separate components that are mounted to the body 351. The C-clip 352 is connected to the piston 305 in a non-rotatable manner. The projection 353 is configured to interact with the control surface 327 of the trigger 311 of the latch 310.

A sensor 360 is mounted to the frame, and is configured to detect one or more of the rotational position, presence or absence of the pawl 324 (and/or trigger 311) and transmit a corresponding signal to the computer controller via a cable. The sensor 360 may be a switch, for example. Other means for sensing the closed or open state of the pawl 324 are known to those skilled in the art, such as magnetic sensors, proximity sensors, Hall-Effect sensor and optical sensors.

Turning now to the operation of the latch 310 shown in FIGS. 4B-4E, in FIG. 4B, the latch 310 is shown in a locked and latched state. In the locked and latched (i.e., closed) state, the latch 310 retains the striker within the pawl 324. If a user were attempt to move the striker away from the latch 310 (or vice versa), the latch 310 would prevent the movement of the striker because the trigger 311 would prevent the pawl 324 from rotating in a counterclockwise direction (as viewed in FIG. 4B) to the open position.

In FIG. 4C, the latch 310 is shown in an unlocked and latched state. To unlock the latch 310, a user instructs the computer controller to actuate the actuator 302, which causes the piston 305 of the actuator 302 to retract. Alternatively, the computer controller may perform this unlocking step in response to an event, such as a vehicle being placed into the Park 'P' position.

Upon retracting, the projection 353 on the cap 350 bears on the control surface 327 of the trigger 311, which causes the trigger 311 to rotate in a counterclockwise direction (as viewed in FIG. 4C) and against the bias of the spring 319. Rotation of the trigger 311 causes the projection 323 of the trigger 311 to separate from the recess 325 of the pawl 324. Once the recess 325 of the pawl 324 separates from the projection 323 of the trigger 311, the trigger 311 is maintained in the unlocked position, and the latch 310 is unlocked. In the unlocked state of the latch 310, the pawl 324 remains in the closed state by virtue of the bias of the spring 338 applied against the pawl 324. In the latched state, the sensor 360 detects the closed state of the pawl 324 and communicates the same to the computer controller. The computer controller may, for example, send a warning to the user if it is determined that the trigger 311 is unlocked (by virtue of the known position of the actuator 302) while another condition is present (e.g., a motor vehicle to which the latch is attached is being driven).

In FIG. 4D, the latch 310 is shown in an unlocked and unlatched state. To move the latch 310 from the latched (i.e., closed) state to the unlatched (i.e., open) state, the user translates the striker away from the latch 310 (or vice versa). The striker moves the pawl 324 (which is unlocked) in the counterclockwise direction (as viewed in FIG. 4D) to the open position and against the bias of the spring 338. The pawl 324 remains in the open state by virtue of the bias of the spring 338 applied against the pawl 324.

In FIG. 4E, the latch 310 is shown in a locked and unlatched state. To lock the latch 310, a user instructs the computer controller to actuate the actuator 302, which causes the piston 305 of the actuator 302 to extend. Upon extending, the trigger 311 is permitted to rotate in the clockwise direction and return to the locked position under the bias of the spring 319. However, while the pawl 324 is maintained in the open/unlatched state, the trigger 311 remains rotated as shown in FIG. 4E due to the interference between the pawl 324 and the trigger 311. Also, it is noted that the force indirectly applied onto the pawl 324 by the spring 319 is less than the force indirectly applied onto the pawl 324 by the spring 338.

To move the latch 310 from the locked and unlatched state of FIG. 4E to the locked and latched state of FIG. 4B, the user moves the striker toward the latch 310. The striker engages the opening in the pawl 324, and the pawl 324 rotates in a clockwise direction (as viewed in FIG. 4B) against the bias of the spring 338. The projection 323 of the trigger 311 rides on the perimeter of the pawl 324 due to the bias of the spring 319 until the striker is captivated by the pawl 324 in the latched position. And, at which time the projection 323 of the trigger 311 is seated in the recess 325 of the pawl 324, thereby locking the pawl 324. The latch 310 is then maintained in the locked and latched state of FIG. 4B.

It should be understood that the latch 310 may be moved between the unlocked states shown in FIGS. 4C and 4D without locking the pawl 324 using the trigger 311. Also, the user can move the trigger 311 between the locked and unlocked states (by way of the computer controller or other device) as desired.

FIG. 5A-5H depict a fifth exemplary embodiment of a latch 410. The latch 410 is similar to the latch 210, and the primary differences between those latches will be described hereinafter.

Figure 5A:
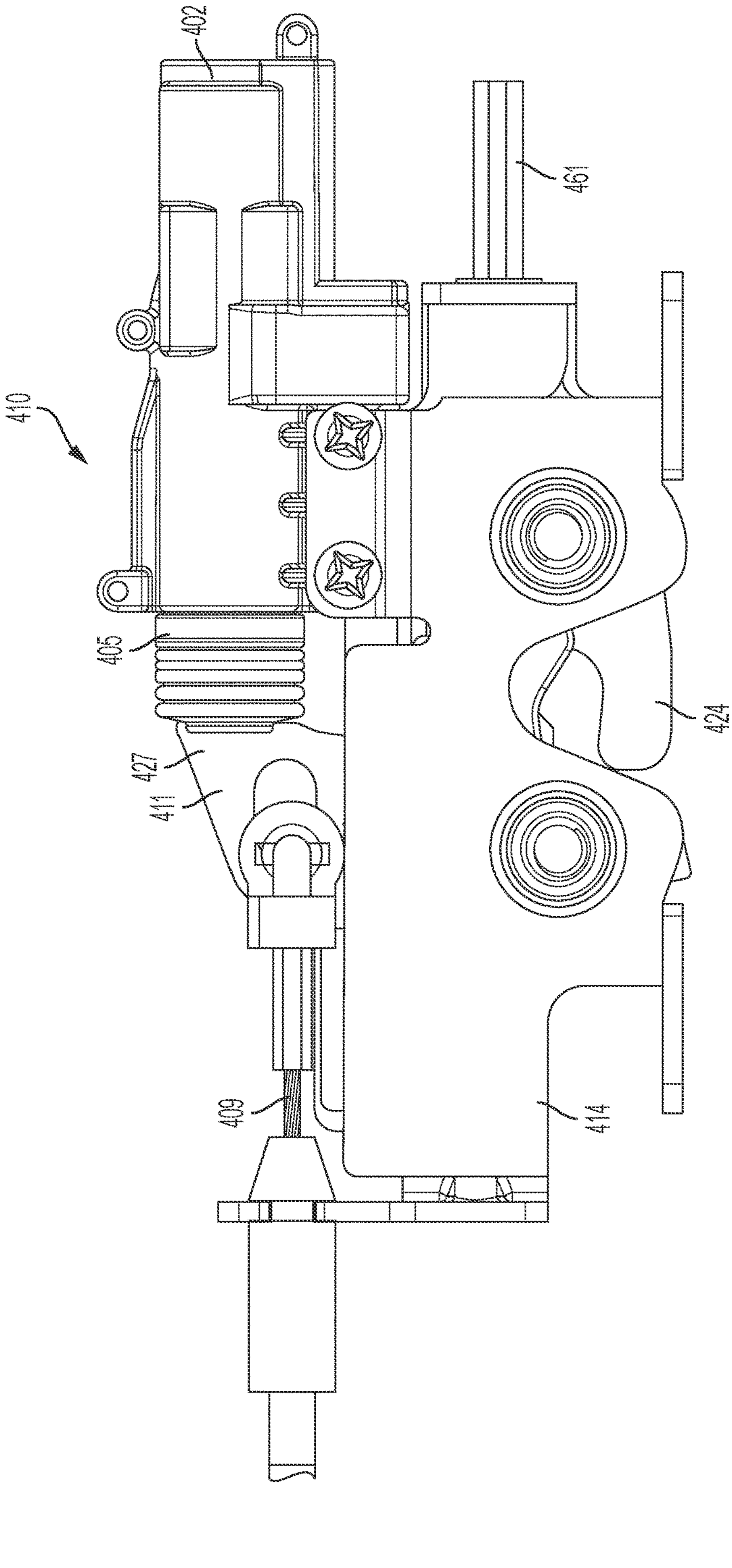
FIG. 5A depicts a front elevation view of a latch according to a fifth exemplary embodiment of the invention.
Figure 5B:
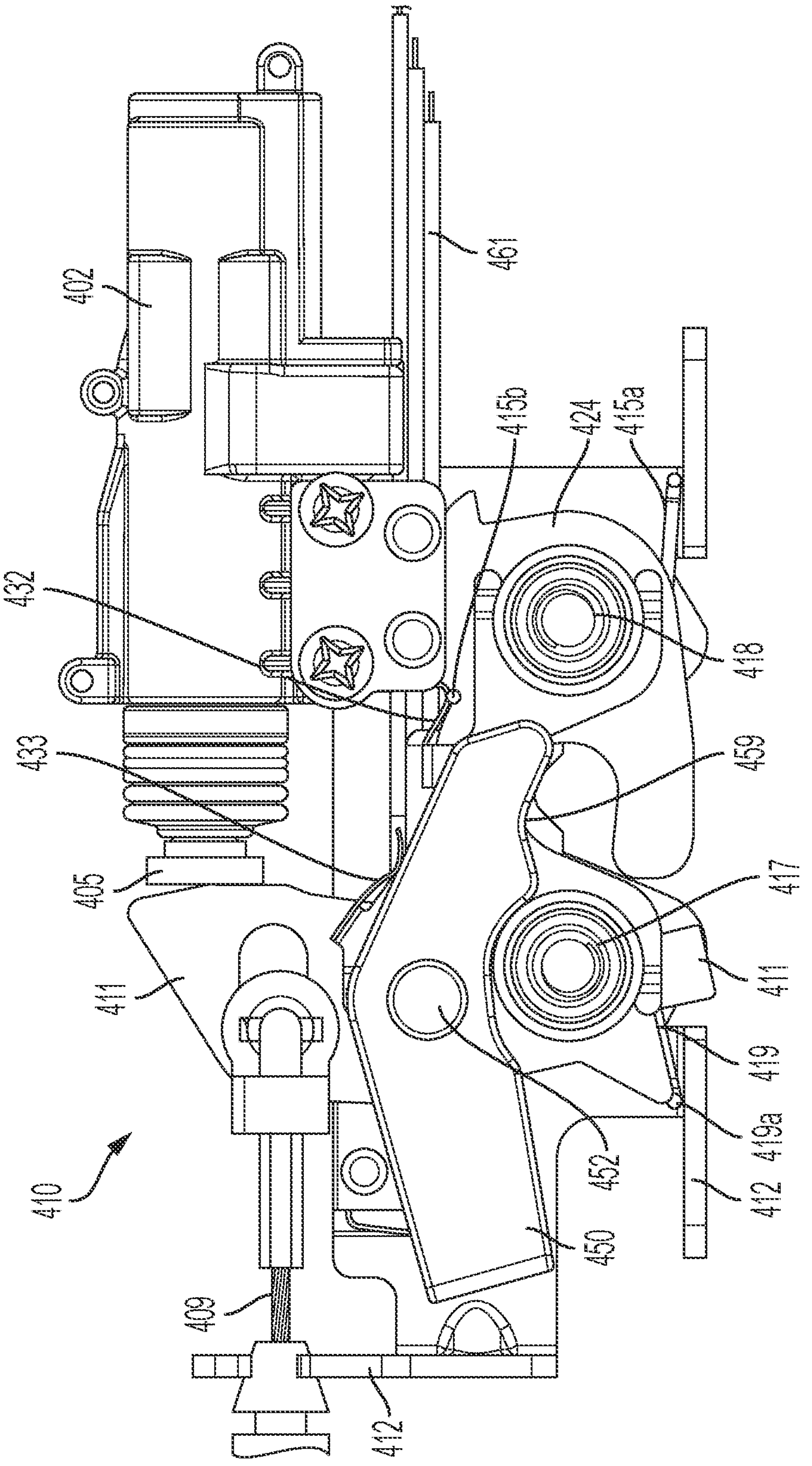
FIG. 5B depicts another front elevation view of the latch of FIG. 5A with the front frame member omitted to reveal interior components of the latch.

In FIGS. 5A and 5B, the latch 410 is shown interacting with an actuator 402 and a release cable 409. The actuator 402 is substantially similar to the actuator 202. Upon receiving a command from the computer controller (not shown), the actuator 402 is configured to actuate (i.e., extend or retract) a piston 405 from the end of actuator 402, and the piston 405 is configured to interact with a trigger 411 of the latch 410 for moving the trigger 411 from a locked position to an unlocked position. The release cable 409 is also connected to an opening in the trigger 411. In operation, the cable 409 may be pulled by either manual or automated means to release the trigger 411 (i.e., move the trigger 411 from the locked position to the unlocked position). The actuator 402 and cable 409 may form part of the latch 410, or may form part of a separate assembly. The actuator 402 and/or cable 409 are omitted in various figures.

Referring now to FIGS. 5A-5D, latch 410 generally comprises a rear frame member 412 and a front frame member 414 (omitted in FIGS. 5B and 5C) that are connected together by pins 417 and 418 and/or other fasteners. A pawl 424 has an opening through which the pin 418 is positioned, and the pawl 424 moves (i.e., rotates) about the pin 418 between a closed position (FIG. 5E) and an open position (FIG. 5F).

Figure 5C:
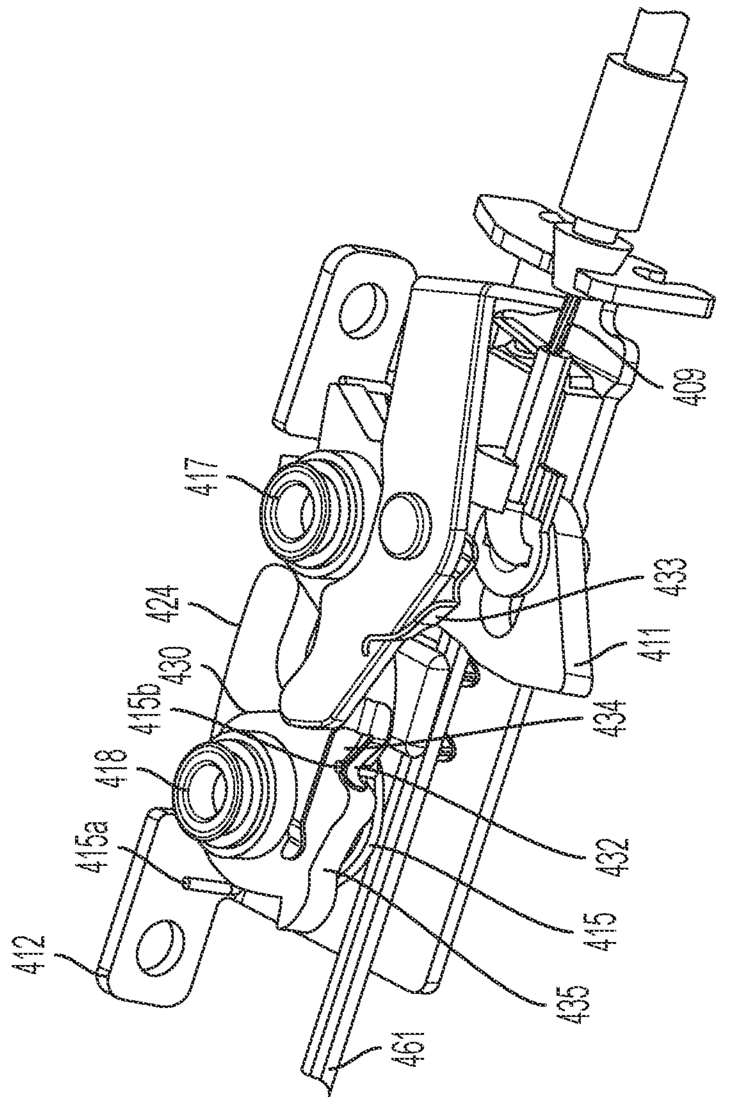
FIG. 5C depicts an isometric view of the latch of FIG. 5B with the actuator omitted.
Figure 5D:
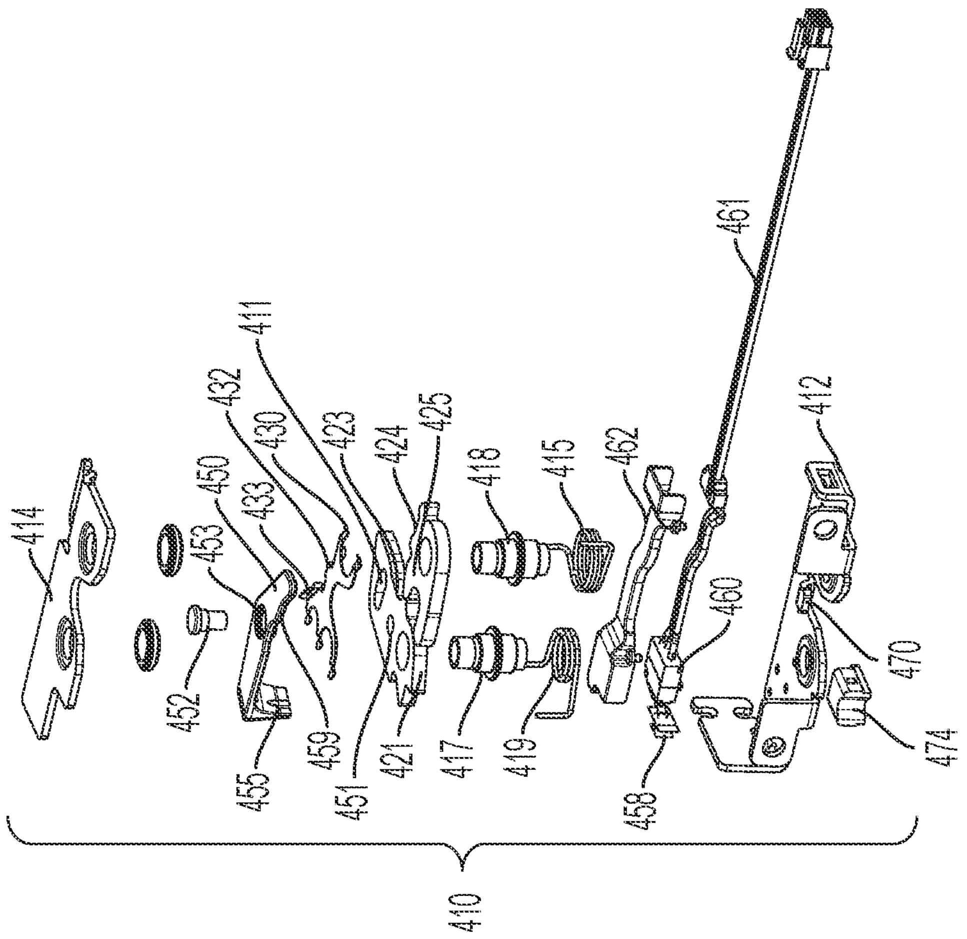
FIG. 5D is an exploded view of the latch of FIG. 5A with the actuator and release cable omitted.
Figure 5F:
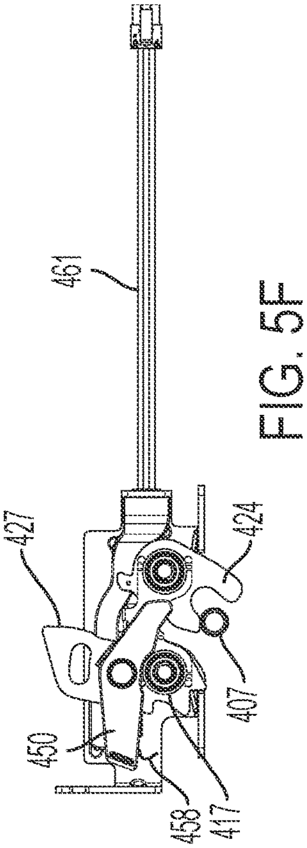
FIGS. 5E and 5F depict front elevation views of the latch of FIG. 5D interacting with a striker.

As best shown in FIGS. 5B and 5C, a torsion spring 415 is mounted around the pin 418 and includes a first free end 415*a* that bears on the rear frame member 412 and a second free end 415*b* that is mounted to in a depression 434 formed on the perimeter of the pawl 424. The spring 415 biases pawl 424 to the open position. A trigger 411 has an opening through which the pin 417 is positioned, and, like the trigger 211, the trigger 411 moves (i.e., rotates) between a locked position and an unlocked position. A torsion spring 419 is mounted around the pin 417 and includes a first free end 419*a* that bears on the rear frame member 412 and a second free end that is mounted to a bearing surface on the trigger 411. The spring 419 biases trigger 411 to the locked position.

Figure 5H:
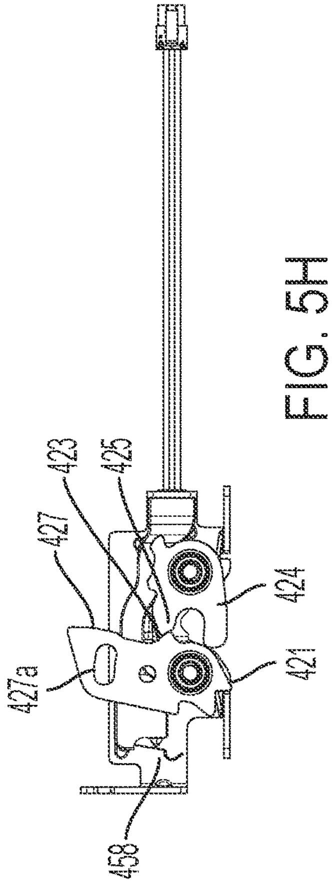
FIG. 5H depicts a front elevation view of the latch of FIG. 5G with the striker bar omitted to reveal the interaction between the trigger and the pawl.
Figure 5E:
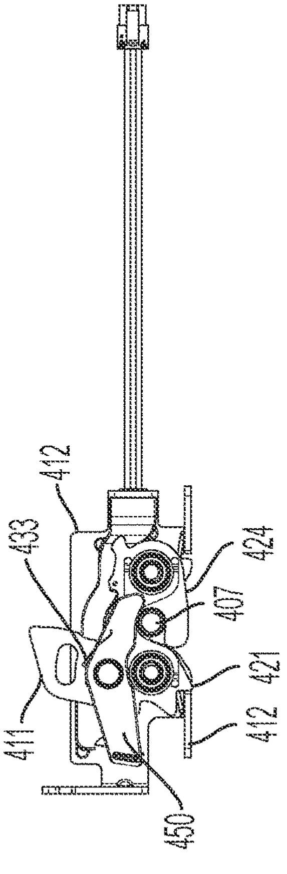
Figure 5G:
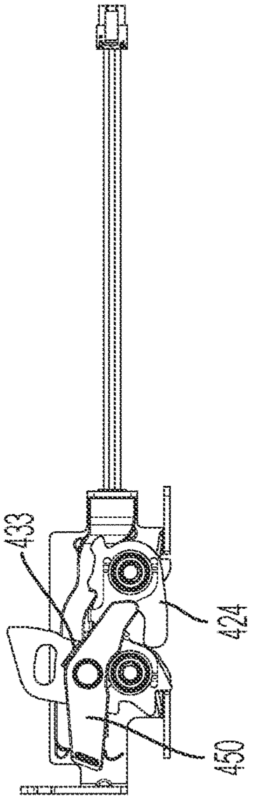
FIG. 5G depicts a front elevation view of the latch shown in FIG. 5E with the striker omitted.
Figure 5I:
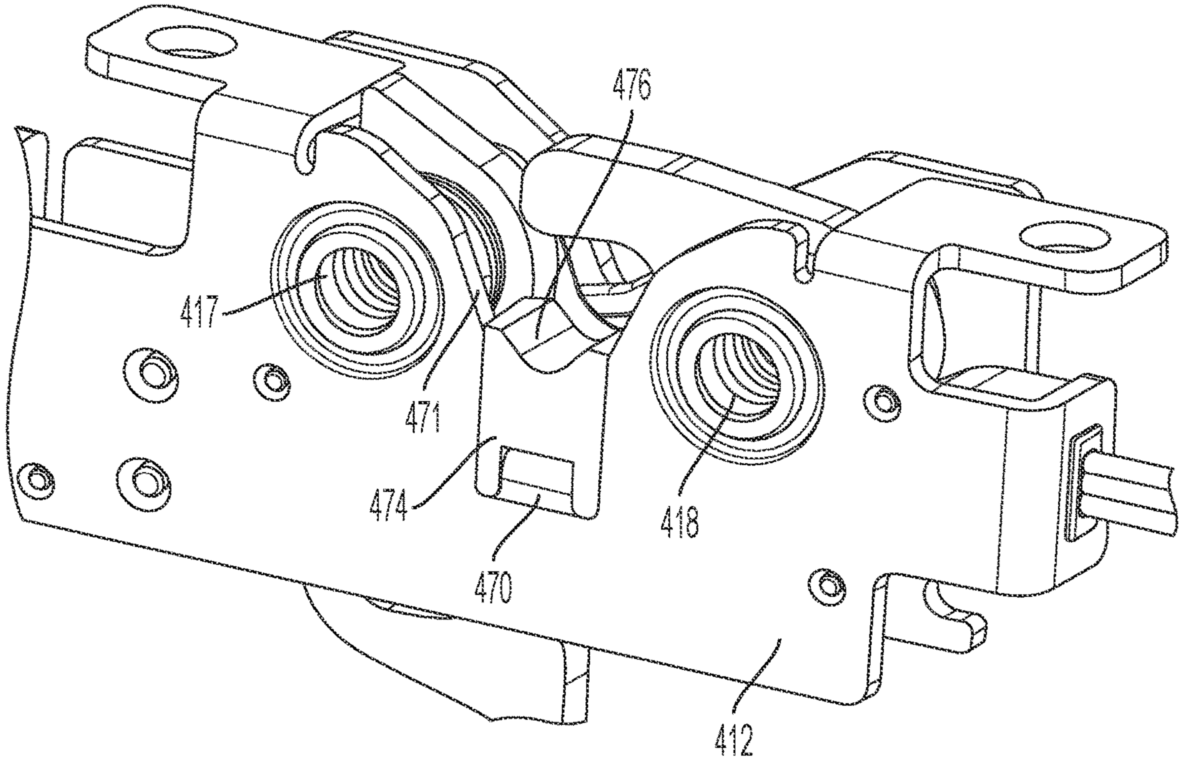
FIG. 5I depicts a rear isometric view of the latch of FIG. 5A.
Figure 5L:
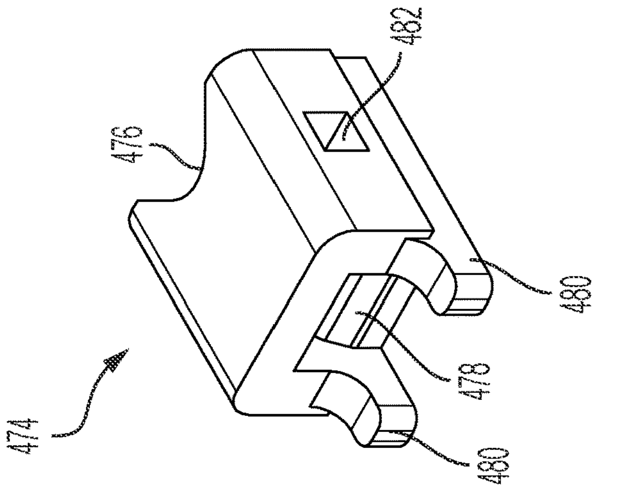
FIG. 5L depicts an isometric view of the bumper of the latch of FIGS. 5A and 5H.
Figure 5K:
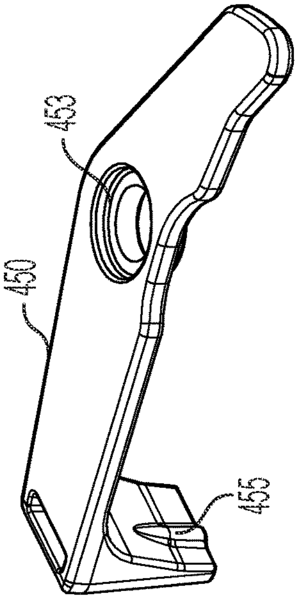
FIGS. 5J and 5K depict isometric views of the striker bar of the latch of FIG. 5A.
Figure 5J:
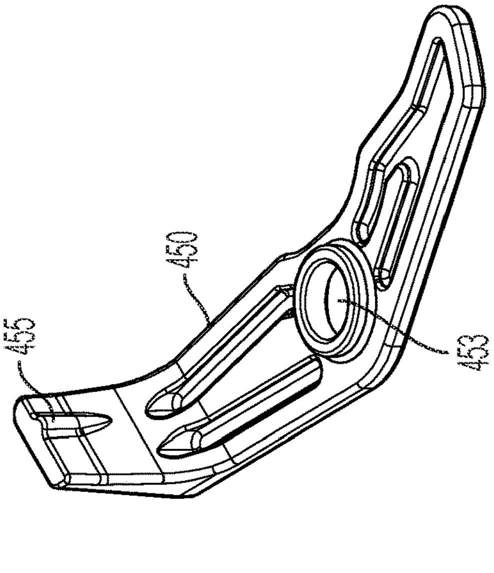
Figure 5M:
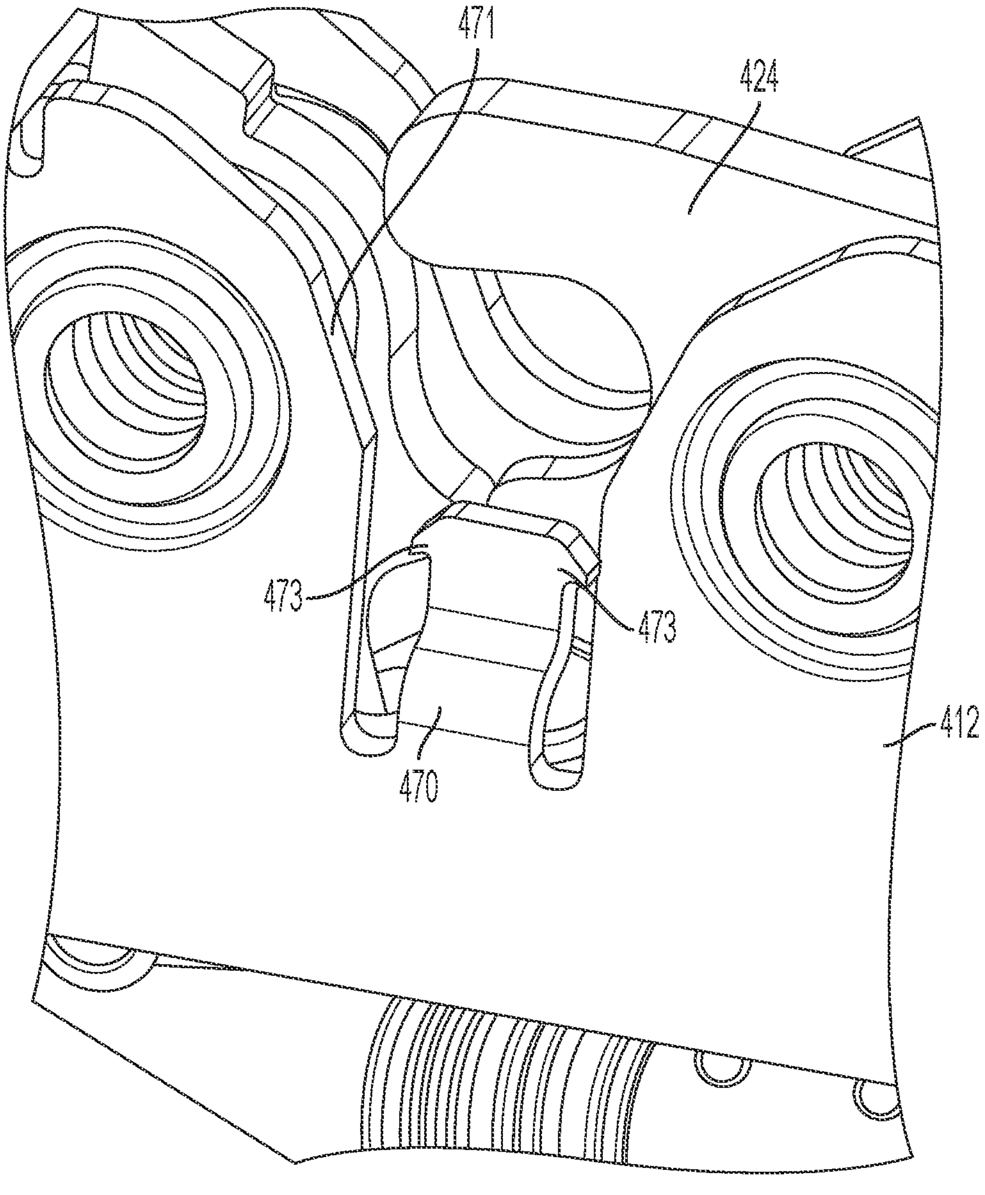
FIG. 5M is a detailed view of the latch of FIG. 5A with various components omitted.
Figure 5N:
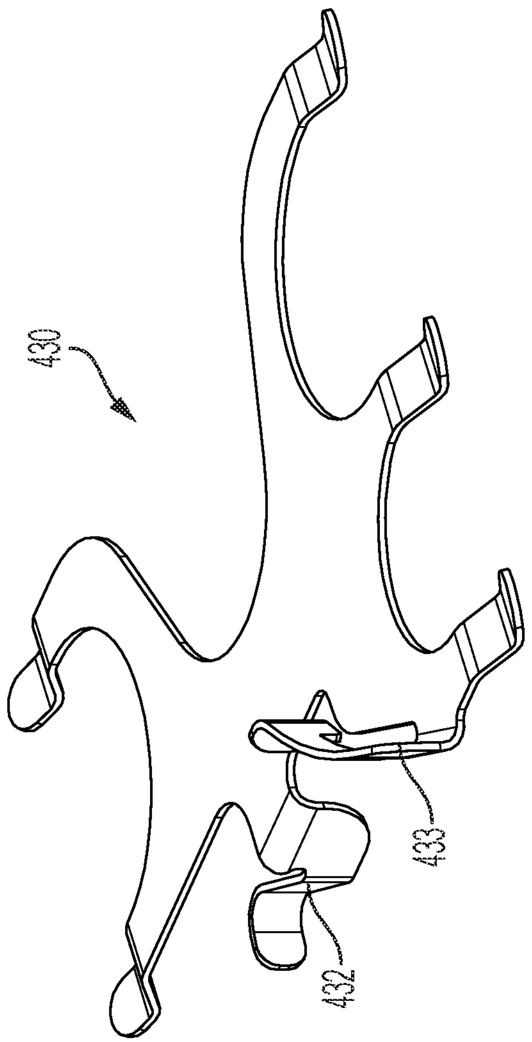
FIG. 5N is an isometric view of the spring of the latch of FIG. 5A.

As shown in FIGS. 5B and 5N, a spring member 430, which is formed from a ductile and resilient material, is sandwiched between (i) the frame member 414 and (ii) the trigger 411 and pawl 424. The spring member 430 includes four legs depending therefrom that urge the trigger 411 and the pawl 424 toward the frame member 412, thereby preventing the trigger 411 and pawl 424 from rattling during operation. First and second spring arms 432 and 433 extend from the spring member 430. The first spring arm 432 is a flexible curved member that is positioned to interact with a surface of the pawl 424. The second spring arm 433 is a flexible curved member that is positioned to interact with a surface of a striker bar 450.

As shown in FIG. 5C, in the closed position of the pawl 424, the first spring arm 432 is seated in a concave recess, indent or depression 434 formed on the outer perimeter of the lower side of the pawl 224. The spring arm 432 rests above the second free end 415*b* of the spring 415. The holding force exerted by the spring arm 432 onto the pawl 424 is greater than the force exerted by the torsion spring 415 such that the pawl 424 remains in the closed position even after the trigger 411 has been moved to the unlocked position. And, in the open position of the pawl 424, the spring arm 432 is seated in another concave recess, indent or depression 435 formed on the outer perimeter of the lower side of the pawl 424. The force exerted by the spring arm 432 onto the pawl 424 retains the pawl in the open position. Therefore, like the latch 10, the latch 410 also may be considered a bi-stable latch because the latch 410 can remain in the open position until it is moved to the closed position and can also remain in the closed position until it is moved to the open position. However, the spring arm 432 may be omitted if so desired, and, in such case, the latch 410 would not be bi-stable.

The trigger 411 includes a tab 421 extending from the perimeter of the trigger 411. In the locked position of the trigger 411 shown in FIGS. 5F and 5H, the tab 421 bears on a bearing surface of the frame member 412. Also, in the locked position, a v-shaped recess 423 is formed along the perimeter of the trigger 411, and a corresponding v-shaped projection 425 formed on the perimeter of the pawl 424 is positioned within the recess 423. Engagement between the recess 423 and projection 425 as well as the tab 421 and frame 412 prevents the pawl 424 from moving in a counterclockwise direction (as viewed in FIG. 5F) toward the open position.

Referring now to FIGS. 5A and 5H, the trigger 411 includes a control surface 427, in the form of a vertically extending projection, that is configured to interact with the piston 405 of the actuator 402. The piston 405 is configured to bear on the bearing surface 427 to move the trigger 411 from the locked position (FIG. 5H) to the unlocked position. The control surface 427 also has a hole or opening 427*a* that is connected to the cable 409, as described earlier, for moving the trigger 411 from the locked position (FIG. 5H) to the unlocked position.

Referring now to FIGS. 5B, 5D, 5E, 5J and 5K, a striker bar 450 is pivotably mounted to an opening 451 (FIG. 5D) in the center of the trigger 411 by a pin 452. The pin 452 passes through an opening 453 in the striker bar 450 and the opening 451 in the trigger 411. Striker bar 450 is directly mounted to the trigger 411. Striker bar 450 is configured to rotate with respect to the trigger 411 about the pin 452. The perimeter of the striker bar 450 includes a concave portion 459 that is configured to interact with the striker 407. The striker bar 450 is an elongated member having an outer surface and an inner surface. A projection or tab 455 projects from the inner surface of the striker bar 450. The tab 455 is configured to interact with a wiper arm 458 of a switch 460.

The switch 460 is connected to a computer controller (not shown) by a cable 461 that is terminated at a connector. A cover 462 is positioned over the switch 460 and at least a portion of the cabling extending therefrom to partially conceal the switch 460. The switch 460 may be fixedly connected to the frame member 412. In operation, in an open state of the switch 460, the tab 455 of the striker bar 450 is not positioned in contact with the wiper arm 458 of the switch 460, thereby indicating that (i) the striker 407 is not positioned within the interior of the latch 410, and/or (ii) the trigger 411 is rotated to the unlocked position. And, in a closed state of the switch 460, the tab 455 is positioned in contact with the wiper arm 458 of the switch 460, thereby indicating that (i) the striker 407 is positioned within the interior of the latch 410, and (ii) the trigger 411 is rotated to the locked position.

If, for example, the striker 407 were positioned within the interior of the latch 410, and the trigger 411 were rotated to the unlocked position, then the tab 455 of the striker bar 450 would not be positioned in contact with the wiper arm 458 of the switch 460, and the switch 460 would therefore be in an open state. This occurs because the striker bar 450 is mounted to and moves with the trigger 411, and, in the unlocked position of the trigger 411, the travel path of the tab 455 of the striker bar 450 is radially outward of, and therefore does not intersect, the stationary wiper arm 458 of the switch 460. This arrangement of the switch 460, trigger 411 and striker bar 450 either substantially reduces the potential of or prevents false 'closed' readings while the trigger 411 is unlocked.

When the switch 460 is closed, it transmits a corresponding 'closed' signal to the computer controller via the cable 461. Other means for sensing the presence or absence of the striker bar 450 are known to those skilled in the art, such as magnetic sensors, proximity sensors, Hall-Effect sensor and optical sensors. Thus, the switch 460 may be more generally referred to as a means for sensing a position, presence or absence of striker bar 450.

As is best shown in FIG. 5B, the second spring arm 433 of the spring member 430 is positioned to bear on the perimeter surface of the striker bar 450. The second spring arm 433 is configured to bias the striker bar 450 in the direction of the striker 407. And, moving the striker 407 into the latch 410 causes the striker bar 450 to rotate with respect to the trigger 411 against the bias of the spring arm 433. As shown in FIGS. 5E and 5F, rotation of the striker bar 450 in the counterclockwise direction is limited by the spring arm 433, and rotation of the striker bar 450 in the clockwise direction is limited by the pin 417.

It should be understood that the first and second spring arms may be replaced by simple spring elements, and that the first and second spring arms are not required to be associated with the same spring component. Thus, the first and second spring arms may be referred to more generally as spring elements herein.

Turning now to FIGS. 5D, 5I, 5L and 5M, the rear frame member 412 includes a bent tab section 470 having an L-shape that extends inwardly toward the interior of the frame. The bent tab section 470 is positioned adjacent and extends from the concave opening 471 in the rear frame member 412 that is provided for accommodating the striker 407. The free end of the bent tab section 470 extends upwardly toward the striker 407. The bent tab section 470 is formed integrally with the frame member 412. The bent tab section 470 is arranged between the pins 417 and 418 as viewed in a longitudinal direction. The bent tab section 470 may be referred to herein more generally as a projection.

A bumper 474 is mounted on the bent tab section 470. The bumper 474 may be composed of an elastomeric material such as rubber, for example. The top end of the bumper 474 includes a concave surface 476 that is configured to interact with the cylindrical body of the striker 407. In operation, the striker 407 contacts the concave surface 476 without producing an audible bump, squeak or rattle. The bottom end of the bumper 474 includes an opening 478 for receiving the free end of the bent tab section 470. The bumper 474 may be connected to the bent tab section 470 using adhesive, for example. Two elongated arms 480 are positioned on opposite sides of the opening 478. In an assembled form of the latch 410, the arms 480 are positioned in the channels that run adjacent the bent tab section 470, as best shown in FIG. 5I. An exterior surface of the bumper 474 is maintained flush with an exterior surface of the frame member 412 and extends within an interior region of the frame formed by frame members 412 and 414. An opening 482, in the form of a rectangular aperture, extends across the width of the bumper 474 (i.e., in the longitudinal direction), and intersects the opening 478. The opening 482 receives barbs 473 (FIG. 5M) on the bent tab section 470 for holding the bumper 474 to the frame.

Turning now to the operation of the latch 410 shown in FIGS. 5E and 5F, in FIG. 5E, the latch 410 is shown in a locked and latched state. In the locked and latched (i.e., closed) state, the latch 410 retains the striker 407 within the pawl 424. And the pawl 424 is held in a fixed rotational position by the trigger 411 due to the interface between the surfaces 423 and 425 (see FIG. 5H). The switch 460 is maintained in a closed position, thereby indicating that (i) the striker 407 is positioned within the interior of the latch 410, and (ii) the trigger 411 is rotated to the locked position.

In FIG. 5F, the latch 410 is shown in an unlocked and unlatched state. To move the latch 410 from the latched (i.e., closed) state to the unlatched (i.e., open) state, the computer controller actuates the actuator 402, which causes the piston 405 of the actuator 402 to extend and bear on the control surface 427 of the trigger 411, which causes the trigger 411 to rotate in a counterclockwise direction (as viewed in FIG. 5F) and against the bias of the spring 419. Rotation of the trigger 411 may result in slight rotation of the pawl 424 until the recess 423 of the trigger separates from the projection 425 of the pawl 424. Alternatively, in lieu of activating the actuator 402, translating the release cable 409 (either manually or by an actuator) would also result in counterclockwise rotation of the trigger 411.

Once the recess 423 of the trigger separates from the projection 425 of the pawl 424, the trigger 411 is maintained in the unlocked position, and the latch 410 is unlocked. In the unlocked state of the latch 410, the pawl 424 remains in the closed state by virtue of the engagement between the spring arm 432 and the pawl 424. If, however, the spring arm 432 were omitted, then the pawl 424 would automatically move to the open state by virtue of the spring 415.

The user then translates the striker 407 away from the latch 410. The striker 407 moves the pawl 424 (which is unlocked) in the counterclockwise direction (as viewed in FIG. 5F) against the bias of the spring arm 432. As the pawl 424 rotates, the spring arm 432 slides along the surface of the pawl 424. The pawl 424 eventually releases the striker 407 as the striker 407 is moved away from the latch 410. At the same time, the striker 407 separates from the striker bar 450, and, in the absence of the striker 407, the second spring arm 433 urges the striker bar 450 to rotate in the clockwise direction. Consequently, the tab 455 of the striker bar 450 separates from the wiper arm 458 of the switch 460, thereby indicating that (i) the striker 407 is not positioned within the interior of the latch 410, and/or (ii) the trigger 411 is rotated to the unlocked position. The computer controller identifies this change in state due to the signals (or absence of signals) transmitted from switch 460.

The pawl 424 remains in the open state by virtue of the engagement between the spring arm 432 and the pawl 424 as well as the force exerted by the spring 415. At this stage, the trigger 411 remains in the unlocked state due to the engagement between the piston 405 and the control surface 427 of the trigger 411.

To return the trigger 411 to the locked position, the computer controller actuates the actuator 402, which causes the piston 405 of the actuator 402 to retract and separate from the control surface 427 of the trigger 411. The torsion spring 419 then returns the trigger 411 to its locked position. At this stage, the pawl 424 remains open due to the bearing force of the spring arm 432.

To return the latch 410 to the locked and latched state of FIG. 5E, the user moves the striker 407 toward the latch 410. The striker 407 engages the concave opening in the pawl 424, and the pawl 424 rotates in a clockwise direction against the bias of the spring 415. The projection 425 of the pawl 424 rides on the perimeter of the trigger 411 (and causes slight rotation of the trigger 411 against the bias of the spring 419) until the striker 407 bears on the bumper 474. And, at which time the projection 425 of the pawl 424 is seated in the recess 423 of the trigger 411. The latch 410 is then maintained in the locked and latched state of FIG. 5E. The tab 455 of the striker bar 450 contacts the wiper arm 458 of the switch 460, thereby indicating that (i) the striker 407 is positioned within the interior of the latch 410, and (ii) the trigger 411 is rotated to the locked position.

It is noted that the various features described in the separate embodiments may be combined or substituted.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A latch assembly comprising:

a frame;

a pawl including a surface for receiving a striker and being movably coupled to the frame between an open and a closed position, wherein, in the closed position, the pawl is positioned to retain the striker to the latch assembly, and, in the open position, the pawl is not positioned to retain the striker to the latch assembly;

a spring positioned against a perimeter surface of the pawl, wherein, in the closed position of the pawl, the spring is configured to bias the pawl such that the pawl remains in the closed position;

a plurality of depressions formed on the perimeter surface of the pawl, which each depression is configured to receive the spring;

wherein, in the open position of the pawl, the spring is seated in one of the depressions, and in the closed position of the pawl, the spring is seated in a different one of the depressions;

a tab that extends from a perimeter of the trigger and configured to bear on a bearing surface of the frame; and a v-shaped recess formed along the perimeter of the trigger and is positioned within a correspondingly v-shaped projection formed on the perimeter of the pawl, such that engagement between the recess and projection and between the tab and the frame prevents the pawl from moving toward the open position.

2. The latch assembly of claim 1, wherein a projection of the pawl is configured to ride along the perimeter of the trigger until the projection of the pawl is seated in the recess of the trigger.

3. The latch assembly of claim 2, wherein the projection of the pawl causes the trigger to rotate against the bias of the spring.

4. The latch assembly of claim 1, wherein the spring is a curved spring arm.

5. The latch assembly of claim 1, further comprising a trigger that is mounted to the frame and configured to retain the pawl in a locked state while the pawl is maintained in the closed position.

6. The latch assembly of claim 5, wherein the trigger includes a control surface that is configured to be moved for releasing the trigger from the pawl so that the pawl can move to the open position.

7. The latch assembly of claim 6, further comprising an actuator that is configured to move the control surface of the trigger.

8. The latch assembly of claim 1, further comprising a torsion spring for biasing the pawl toward the open position.

* * * * *